United States Patent [19]

Altenburger et al.

[11] 3,956,592
[45] May 11, 1976

[54] AUTOMATIC TOLL TICKETING

[75] Inventors: Otto Altenburger, Rochester; Sureshar L. Soni, Henrietta, both of N.Y.

[73] Assignee: Stromberg-Carlson Corporation, Rochester, N.Y.

[22] Filed: Sept. 9, 1974

[21] Appl. No.: 504,472

[52] U.S. Cl. .......................... 179/7.1 TP
[51] Int. Cl.² ........................... H04M 15/10
[58] Field of Search ........ 179/7.1 TP, 7.1 R, 7 MM, 179/7 R

[56] References Cited
UNITED STATES PATENTS

| | | | |
|---|---|---|---|
| 3,227,808 | 1/1966 | Morris et al. | 179/7.1 TP |
| 3,770,893 | 11/1973 | Conerly | 179/7 MM |
| 3,828,135 | 8/1974 | Padgett | 179/7 R |
| 3,851,102 | 11/1974 | Bauernfeind | 179/7.1 TP |

Primary Examiner—Kathleen H. Claffy
Assistant Examiner—Gerald L. Brigance
Attorney, Agent, or Firm—William F. Porter, Jr.; William A. Marvin

[57] ABSTRACT

A method and apparatus are disclosed for providing automatic toll ticketing in a common control telephone system. The method includes sequences which provide automatic ticketing for station-to-station sent paid local or tributary terminations with automatic or operator number identification. The apparatus includes an adapter circuit connected to the common control for directing the transfer of toll information from common registers to a toll buffer. An automatic recorder is controlled by the toll buffer and a plurality of recording trunks to receive charge information and provide a permanent record of the toll charges for the common control system.

20 Claims, 27 Drawing Figures

OUTPUT FORMAT

| CHAR | | MEANING |
|---|---|---|
| 0 | | START CHARACTER (HEXADECIMAL "D" OR "13") |
| 1 | TH | TRUNK NUMBER |
| 2 | H | |
| 3 | T | |
| 4 | U | |
| 5 | U | TOC |
| 6 | U | INFO. DIGIT |
| 7 | H | |
| 8 | T | OVERSEAS CODE |
| 9 | U | |
| 10 | H | AREA CODE |
| 11 | T | |
| 12 | U | |
| 13 | H | OFFICE CODE |
| 14 | T | |
| 15 | U | |
| 16 | TH | DIRECTORY NUMBER (CALLED PARTY) |
| 17 | H | |
| 18 | T | |
| 19 | U | |
| 20 | H | AREA CODE |
| 21 | T | |
| 22 | U | |
| 23 | H | OFFICE CODE |
| 24 | T | |
| 25 | U | |
| 26 | TH | DIRECTORY NUMBER (CALLING PARTY) |
| 27 | H | |
| 28 | T | |
| 29 | U | |

INPUT FORMAT

| TIME SLOT | | DATA |
|---|---|---|
| TS2 | | TYPE OF CALL |
| TS3 | A DIG | AREA CODE (CALLED PARTY) |
| TS4 | B DIG | |
| TS5 | C DIG | |
| TS6 | D DIG | OFFICE CODE |
| TS7 | E DIG | |
| TS8 | F DIG | |
| TS9 | G DIG | DIRECTORY NUMBER |
| TS10 | H DIG | |
| TS11 | J DIG | |
| TS12 | K DIG | |
| TS13 | L DIG | SPARE |
| TS14 | M DIG | |
| TS15 | COS X | CLASS OF SERVICE |
| TS16 | COS Y | |
| TS23 | | INFORMATION DIGIT |
| TS24 | A DIG | OFFICE CODE (CALLING PARTY) |
| TS25 | B DIG | |
| TS26 | C DIG | |
| TS27 | A DIG | DIRECTORY NUMBER |
| TS28 | B DIG | |
| TS29 | C DIG | |
| TS30 | D DIG | |

FIG. 8

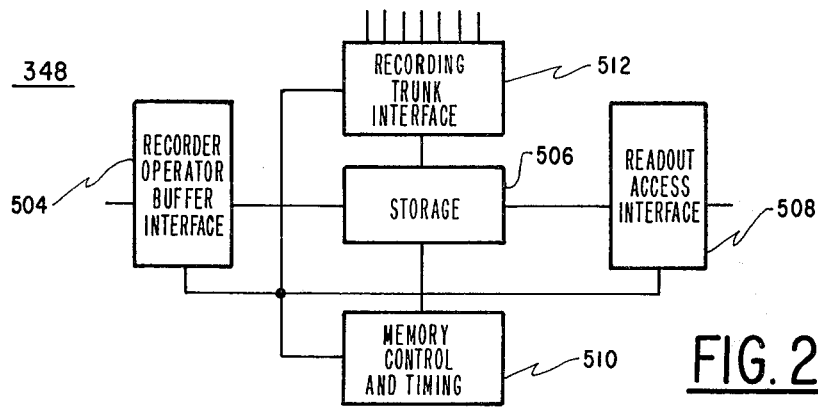

FIG. 20

| WORD | FUNCTION | WORD | FUNCTION | | WORD | FUNCTION | | WORD | FUNCTION | | WORD | FUNCTION | |
|---|---|---|---|---|---|---|---|---|---|---|---|---|---|
| 0 | NOT UTILIZED | 16 | DIGIT A | | 32 | DIGIT A | | 48 | | | 64 | SPARE | |
| 1 | SEIZURE FINAL ON HOOK SPARE | 17 | DIGIT B | AREA CODE | 33 | DIGIT B | DIRECT-ORY NO. | 49 | SPARE | | 65 | THOU | |
| 2 | SPARE | 18 | DIGIT C | | 34 | DIGIT C | CALL-ING NO. | 50 | | | 66 | HUND | TRUNK EQUIP. NO. |
| 3 | INITIAL CHARGE DELAY COUNT | 19 | DIGIT A | | 35 | DIGIT D | | 51 | SECONDS UNITS | ELAPSED TIME | 67 | TENS | |
| 4 | 700MS DETECTED SPARE CLOCK WRITTEN SPARE | 20 | DIGIT B | OFFICE CODE | 36 | | | 52 | SECONDS TENS | | 68 | UNITS | |
| 5 | FOUR SECOND COUNTER | 21 | DIGIT C | | 37 | | CALLED NO. | 53 | MONTH TENS | | 69 | | |
| 6 | FIRST 1-1/2 SEC. DET. EXTRA LONG MIN. COMP. ANSWER SUPERVISION SPARE | 22 | DIGIT A | | 38 | | | 54 | MONTH UNITS | DATE | 70 | | |
| 7 | ONE MINUTE COUNTER | 23 | DIGIT B | DIRECT-ORY NO. | 39 | | | 55 | DAY TENS | | 71 | | |
| 8 | | 24 | DIGIT C | | 40 | | | 56 | DAY UNITS | | 72 | | |
| 9 | SPARE | 25 | DIGIT D | | 41 | SPARE | | 57 | HOURS TENS | | 73 | SPARE | |
| 10 | | 26 | DIGIT A | | 42 | | | 58 | HOURS UNITS | CONNECT TIME | 74 | | |
| 11 | TOC 5 (DDD) | 27 | DIGIT B | AREA CODE | 43 | | | 59 | MINUTES TENS | | 75 | | |
| 12 | 0-GOOD IDENT. 1-ONI 2-ANI-FAIL | INFO. DIGIT | 28 | DIGIT C | | 44 | | CALL-ING NO. | 60 | MINUTES UNITS | | 76 | |
| 13 | DIGIT A | OVER SEAS CODE | CALLED NO. | 29 | DIGIT A | | 45 | | 61 | MINUTES UNITS | | 77 | |
| 14 | DIGIT B | | | 30 | DIGIT B | OFFICE CODE | 46 | | 62 | MINUTES TENS | ELAPSED TIME | 78 | |
| 15 | DIGIT C | | | 31 | DIGIT C | | 47 | | 63 | MINUTES HUNDRED | | 79 | |

FIG. 21

AUTOMATIC TOLL TICKETING

BACKGROUND OF THE INVENTION

The present invention relates generally to recording systems in common control telephone equipment and is more particularly directed to an automatic message accounting system for toll communications.

Toll ticketing or providing a hard copy record of the rate and time a subscriber uses telephone system equipment has been a feature in telephone systems almost since their conception.

In older systems, an operator was required to handwrite toll tickets for the subscribers making toll calls. In more recent systems with the advent of direct distance dialing (DDD), the concept of automatic message accounting or ticketing without operator assistance has been developed.

Automatic message accounting systems are a necessity for the common control telephone systems of today. The speed at which such telephone systems operate and the number of subscribers they may handle simultaneously must be matched by an accounting system of similar speed and capability. Also, modern automatic message accounting systems should have the capability of toll charging all unassisted dialed calls from a subscriber. These calls generally have the designation of sent paid, station-to-station (SPSS) terminations and are usually accessed by the use of a 1+ called number code. The SPSS or 1+ call may be one of two types, a local or a tributary connection.

The local call requiring local automatic message accounting (LAMA) is made by a subscriber, serviced by the exchange with the ticketing equipment, to another subscriber at an external exchange. However, it is generally inefficient to equip every exchange with ticketing equipment and a central exchange, usually a larger class office, is selected to perform centralized automatic message accounting (CAMA) for a plurality of tributary office exchanges. Therefore, it is a general requirement that such CAMA ticketing equipment provide a large traffic handling capability with respect to both speed and size. The tributary connection through the ticketing exchange may be made either to a local subscriber at the ticketing exchange or to another tributary office. It would also be advantageous to ticket both LAMA and CAMA calls with common ticketing equipment.

Many CAMA and LAMA systems have automatic number identification (ANI) for directing the calling number into the accounting system. There are instances, however, where SPSS calls are made from multiparty lines or exchanges without ANI or instances where a request for the ANI results in an equipment failure. Provision should be made in modern AMA systems for handling toll ticketing of these calls with the same facility as the ANI terminations.

One solution for providing a modern automatic message accounting system has been proposed in U.S. Pat. No. 3,829,617, issued to Caithamer, et al. The proposal includes the insertion of service junctors into the path between an originating office and a toll switching exchange. The junctors are connected to a plurality of receivers and information sent to the toll exchange is intercepted and recorded and then resent by sending circuits. The primary problem with such a system is that the common control of the toll exchange must wait for the information until the AMA system has recorded and resent it. This system also lacks facilities for providing efficient LAMA terminations or calls depending on ONI.

Another AMA system is described in U.S. Pat. No. 3,601,542 issued to Stewart, et al. In this system a plurality of recording trunks are used at the toll switching office to store information in a dynamic or recirculating memory. Although this system advantageously provides the recorder memory on a time-shared basis to the common control for information storage, it has the disadvantage of increasing the connection time of a toll call by requiring a register-sender to outpulse the toll information to the recorder through the recording trunks.

Accordingly it is an object of the present invention to provide a high capacity AMA system with increased speed.

It is a further object of the invention to provide an AMA system with combined LAMA and CAMA capability.

It is another object of the invention to provide for ticketing calls of a 1+ nature requiring ONI or incurring an ANI failure.

SUMMARY OF THE INVENTION

The invention relates to an automatic toll ticketing system for local or tributary sent-paid station-to-station calls with automatic or operator number identification. The system includes a toll buffer circuit which scans a plurality of common registers in the common control during their register common access time for a toll indicator. If the correct indicator is located during the scan, the toll buffer reads and stores information flowing between the registers and path finding translation circuits to record toll information about the call. This access requires no additional common control time to accomplish the transfer of information into the toll buffer circuit, as the storage is simultaneous with the path finding function. The traffic capability of the accounting system, therefore, is as great as the common control's register accessing capability and provides a compatible match between the two.

The common registers scanned for a toll indicator include local registers used for path finding between local line circuits and outgoing recording trunks and trunk registers used for path finding between an incoming trunk and a recording trunk destined for a local subscriber or an external exchange. The trunk registers are further provided with circuit means including an ONI trunk and ONI link. The ONI circuit means provide for operator identification of the calling number in all SPSS calls in case of lack of ANI facilities or instances of ANI failure and allows an operaator to key the number into the trunk register for call completion. By scanning both the local and trunk registers, combined LAMA and CAMA ticketing is provided by the system.

After the toll indicator has been located and the call information transferred to the toll buffer circuit the number of the recording trunk seized by the path finding circuitry is sent to the toll buffer circuit for storage.

The toll buffer circuit reformats the data from the common registers and stores the seized trunk number while waiting for a switch-through indication from the common control that the call has been connected and should be ticketed. Data in the toll buffer is then transferred to a recirculating recorder buffer circuit to be synched against a plurality of recirculating trunk recorder memories. When the data is in synchronism, the recorder buffer circuit transmits it continuously during cell address times to all the trunk recorder memories.

A group of recording trunk circuits is assigned to each trunk recorder memory and has a corresponding dedicated cell address in the memory that circulates with a sequential scan of the group. When a memory recognizes the trunk number of one of its group, the data is loaded into the cell associated with the trunk. The memories provide easy access for storage and retrieval of the toll data in recirculating memories. The system has a reduced access time for a record by providing a plurality of the memories operating in synchronous parallel fashion. This feature reduces the maximum access time of a record to the recirculation cycle of one of the trunk recorder memories.

Each trunk recorder memory has input register circuit means to write the call information into the storage while the memory is recirculating and output register circuit means to read the information out. The output register circuit means also provides a means to recirculate the data to the input register circuit means via a buffer register circuit means. Included between the output register circuit means and the input register circuit means are modifying circuit means that allow data to be modified or added in a record or a control signal to be written and erased. An adder comprising a portion of the modifying circuit means is used for incrementing counting data, such as elapsed time of a call.

The recording trunk through the modifying circuit means writes seize and answer entry signals into the corresponding cell address of the recording trunk being connected. The seize and answer entry signals are used by the memories to determine when to start timing a toll charge if both are written or when to stop timing a toll charge if one is erased. Upon the finalization of a call, a disconnect entry is written into the trunk recorder memory which in turn sets up a service request to a readout access circuit controlling dual readout circuits for transferring the toll record to an output medium. The readout access will scan the trunk recorder memories for a service request when one of the dual readouts is free. The toll record is transferred to the readout via the access when the readout access detects these two conditions. Along with the recorder data, a data check signal is sent from the trunk recorder memory to compare the data for any errors in transmission to the readout.

BRIEF DESCRIPTION OF THE DRAWINGS

FIG. 8 is an illustrative representation of the data format that information assumes entering and leaving the toll buffer illustrated in FIG. 6;

FIG. 20 is a detailed block diagram of a trunk recorder memory circuit illustrated in FIG. 15;

FIG. 21 is a detailed illustration of the loading program for the trunk recorder memory illustrated in FIG. 20;

DESCRIPTION OF THE PREFERRED EMBODIMENT

Figure 1:
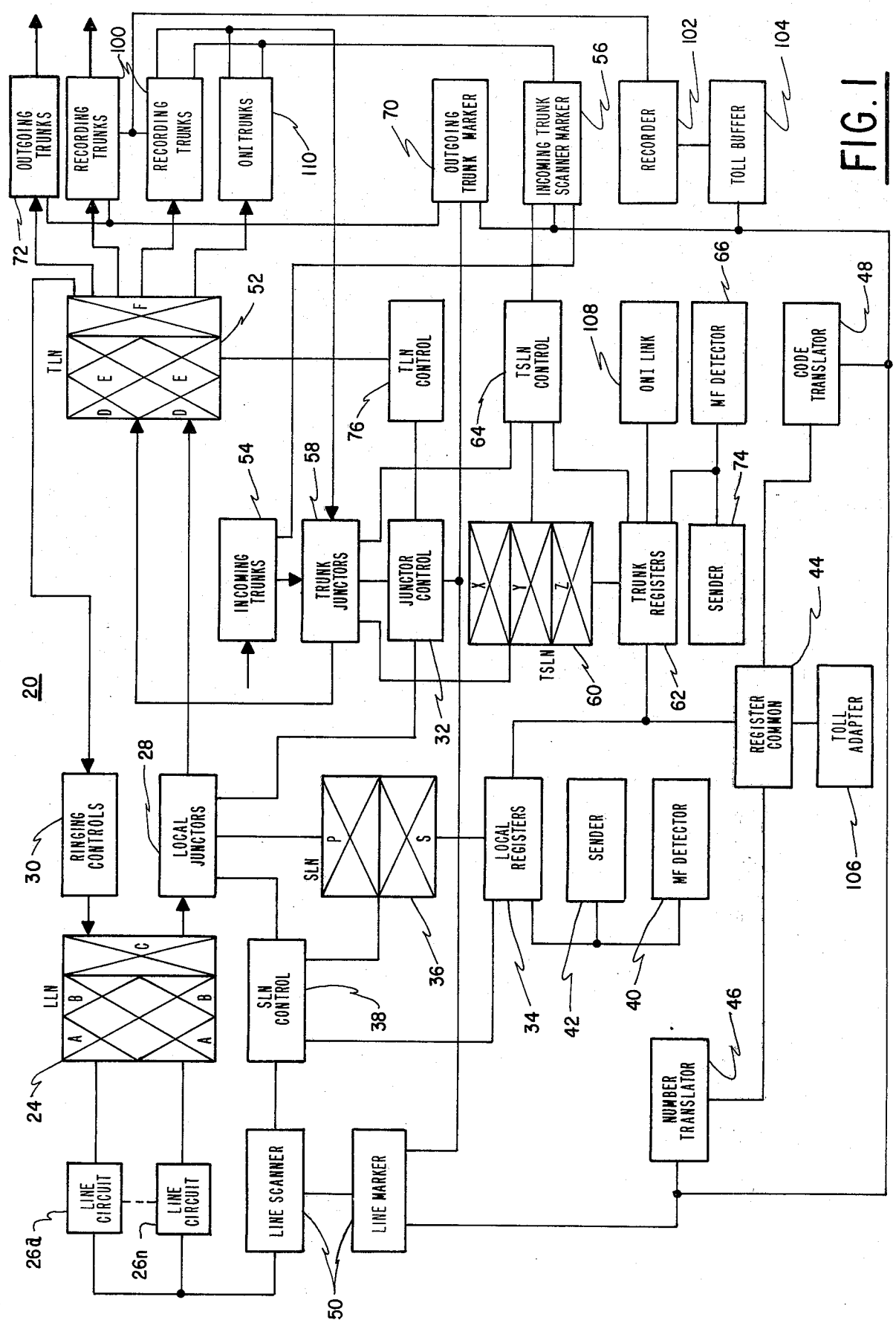
FIG. 1 is a system block diagram of a common control telephone system including the automatic toll ticketing apparatus of the present invention.

Referring now to FIG. 1, there is shown a block diagram of a common control telephone system, generally designated 20, including an automatic message accounting system constructed in accordance with the invention.

Common control switching system 20 includes a line link network (LLN) 24 which functions as a concentrator for originating line calls and as a fan-out for terminating calls. The LLN, comprising three stages of matrices (A, B and C), is used for both originating and terminating types of traffic and is connected at one end to a plurality of line circuits 26a–26n, which vary in number depending upon the telephone service to be offered.

Line circuits 26a–26n are more fully described in U.S. Pat. No. 3,708,627; entitled, "Plug-In Line Circuit Arrangement", filed on June 15, 1971, in the name of Otto Altenburger and assigned to the assignee of the present invention, the structural details of which are herein incorporated by reference.

LLN 24 provides a unique path between circuits connected to opposite ends of the network. Each of the switching networks in FIG. 1 includes matrix switches consisting of relays, each having a mark or control winding for initially actuating the relay and a hold or sleeve coil connected in series with its own contacts for maintaining the relay in an actuated condition after a path through the network has been established.

The C stage of LLN 24 provides the termination for both originating traffic from line circuits 26a–26n and incoming traffic to the line circuits. These terminations of LLN 24 are connected to local junctors 28 for originating traffic and to ringing controls 30 for terminating traffic. The number of local junctors and ringing controls provided depends upon the traffic requirements for this system.

The ringing controls are more fully described in U.S. Pat. No. 3,671,678, entitled, "Ringing Control Circuit", filed on Dec. 22, 1970, in the name of Otto Altenburger and assigned to the assignee of the present invention, the structural details of which are herein incorporated by reference. Local junctor circuits 28 and their control (by junctor control 32) are more fully described in U.S. Pat. No. 3,705,268; entitled "Passive Junctor Circuit And Selectively Associated Junctor Control", filed on Dec. 22, 1970, in the name of Otto Altenburger and assigned to the assignee of the present invention, the structural details of which are herein incorporated by reference.

Local junctors 28 serve as a focal point for all originating type traffic, including provisions for connecting the line circuits 26a–26n to local registers 34 via a service link network (SLN) 36 and provisions for providing transmission battery for calling and called parties on intra-office calls and are under the control of the calling party. When trunk or station busy conditions are encountered, the local junctors 28 provide the busy tone to the calling party.

Service link network 36 includes two stages of matrices (P and S) and is controlled by a SLN control circuit 38 for connecting the calling line circuits 26a–26n (via one of the local junctors 28) to one of the plurality of local registers 34 which, when connected to local junctors 28, provide dial tone and include apparatus for acting on the instructions of the subscriber. Local junctors 28 terminate at the S stage. The dial pulse acceptors function as an interface between local junctors 28 and the local registers 34. The local registers 34 each consist of a dial pulse acceptor (DPA), register storage and register output and are connected to a sender 42 for providing outpulsing. The DPA's provide the dial tone to the calling subscriber and also detect rotary dial pulses and extend the pulses to storage sections in local reigsters 34. In the event of multifrequency signalling by the subscriber, the frequencies are detected by MF detectors 40 connected to the dial pulse acceptors. The registers 34 and senders 42 are controlled by a register common 44 which contains the necessary control unit. Local registers 34 are connected to the register common 44 on a time division multiplex basis wherein information is passed from one piece of equipment to another on a common bus. Register common 44 is also connected to communicate with a number translator 46 and a code translator 48 on a time division multiplex basis. The translation circuits provide information such as equipment number, ringing code, routing informaton and class-of-service (COS). The number translator 46 is connected to a line scanner-marker circuit 50 which has the means to detect service requests and means to access the individual line circuits 26a–26n.

The ringing controls 30 connect ringing generators to terminating or called stations, detect off-hook conditions (ring-trip) of the called station and provide ringback tone for the calling station. Each line circuit can be connected to a plurality of ringing controls which are accessed from a trunk line network (TLN) 52 so that a ringing control is automatically connected to the terminating line circuit as soon as a connection to that line is complete.

Line scanner circuit 50 continuously checks line circuits 26a–26n for an off-hook condition. Line scanner-marker circuit 50 is also used for both the originating and terminating types of traffic. In the event of originating traffic, the line scanner stops when an off-hook condition is detected and transmits the information from its counter circuits to a marker circuit to mark the particular line circuit 26a–26n and enables SLN control 38 to initiate a path finding operation between an available local register 34 and the line circuit 26a–26n requesting service. In the event of terminating traffic, the line scanner 50 is controlled by the number translator 46 and receives an equipment number from the number translator 46 to mark the line circuit 26a–26n with the particular equipment location and in addition, in terminating traffic, the line marker 50 also transmits the terminating subscriber classes of service, ringing code, busy or idle status and types of ringing required through junctor control 32 to ringing control 30. Line scanner-marker circuit 50 is more fully disclosed in U.S. Pat. No. 3,699,263, entitled, "Line Scanner And Marker Using Group Scanner", filed on Dec. 23, 1970, in the names of Gunter Neumeier and Otto Altenburger and assigned to the assignee of the present invention, the structural details of which are herein incorporated by reference.

In operation, when a calling telephone goes off-hook, line scanner-marker 50 detects the off-hook condition and marks the line circuit connection to the A stage of LLN 24. Simultaneously, line scanner-marker circuit 50 signals SLN control 38 to begin a path finding process for connecting the marked line circuit to one of local registers 34. SLN control 38 detects and locates a path in a three step scanning process. During the first scan, the existence of a free path between a free local register 34 and the line circuit is located and the free local register 34 and its corresponding stage S matrix module is identified. During the second scan, a free path through a P stage matrix module is identified. Finally, during the third scan, a free local junctor 28 is identified. The connection of the local junctor 28 to LLN 24 and the connection through SLN 36 are now completed. When path finding is complete, the relay coils of the selected matrix in LLN 24 and SLN 36 are energized. The metallic connections through the tip and ring leads are checked, and if the connection is complete the sleeve coil connections are effected and the connected local junctor 28 is seized. At this time, SLN control 38 and line scanner-marker circuit 50 are released, and the local register 34 is connected to the subscriber to receive dialed information. Once the subscriber information has been dialed into a local register 34, the call must be routed either internally to another local subscriber or externally to another exchange (tributary office).

Incoming calls from other exchanges are applied to one of a plurality of incoming trunk circuits 54. Incoming trunk scanner-marker circuit 56 continuously scans the incoming trunk circuits 54 for a seized incoming trunk and, when such a seized trunk is located, a scanner circuit stops and transmits the trunk equipment number to a marker circuit, identifying the particular incoming trunk circuit 54. The identified incoming trunk circuit 54 is connected to a trunk junctor 58 (which is essentially identical to a local junctor 28, but is connected between the incoming trunk circuit 54, TLN network 52 and a trunk service line network — TSLN 60). Trunk junctors 58, which function as a focal point for all incoming traffic, include provisions for connecting the incoming trunk circuit 54 to any one of a plurality of trunk registers 62, via TSLN 60, which provide incoming and called parties with transmission battery and, when encountering either trunk or station busy conditions, return a busy tone to the incoming call.

A TSLN control 64 is provided and is arranged to locate a path between trunk junctors 58 and trunk registers 62. Trunk junctors 58 are terminated on the X stage matrix modules of TSLN 60 and trunk registers 62 are terminated on the Z stage matrix modules. TSLN 60 is divided into a number of separate grids. The incoming trunk scanner-marker circuit 56 signals TSLN control 64 which of the grids will be used for accessing one of trunk registers 62 as determined by the trunk junctor 58 involved in the connection. Trunk registers 62 include a dial pulse acceptor interface and subcircuits including a register storage and register output. A multifrequency detector 66 is also connected to trunk registers 62. The subcircuits in trunk register 62 and multifrequency detector 66 are controlled by register common 44 on a time division multiplex basis. Code translator 48 is connected to an outgoing trunk marker circuit 70 which is arranged to identify outgoing trunk and recording trunk groups 72, 100, and is more fully explained in U.S. Pat. No. 3,732,377, entitled, "Outgoing Trunk Marker", filed on Dec. 31, 1970, in the names of Otto Altenburger and David Stoddard and assigned to the assignee of the present invention, the structural details of which are herein incorporated by reference. A sender circuit 74 is also connected to the trunk register 62 to provide outgong pulsing.

Since trunk junctors 58 are identified by the incoming trunk scanner-marker circuit 56, only a two step scan is required in the path finding scheme of TSLN control 64. During the first scan a free path between a free trunk register 62 and the seized trunk junctor 58 is located, the free trunk register 62 is identified and marked and the connected Z stage module is identified. During the second scan, a free path through the X and Y stage matrix modules to the marked trunk junctors 58 is located, the mark relay coils through the Y and Z stage matrix modules are energized and the mark relay coils through the Z stage matrix modules to the marked trunk register 62 are energized. When the connection between the trunk junctors 58 and the trunk registers 62 is completed, the metallic connections through the tip and ring leads are checked and the sleeve connections are completed. TSLN control 64 and incoming trunk marker 56 are then released. When the incoming information has been received by one of trunk registers 62, the call is either routed internally to a local subscriber or externally to other exchanges via an outgoing trunk 72 or via recording trunk 100.

TLN 52 is arranged to provide for termination of local traffic to local subscribers, termination of incoming calls from other exchanges to local subscribers and connections of incoming calls from external exchanges to other external exchanges. TLN 52 includes D and E stage matrix modules and, when further expansion is required, an F stage marix module. The D stage provides an entrance to TLN 52 and is connected to local junctors 28 and to trunk junctors 58. The exit from TLN 52 is provided by the F stage which is connected via ringing circuits 30 to LLN 24 and to outgoing trunks 72.

A TLN control 76 and junctor control 32 provide path finding through TLN 52 for both internally terminated calls and outgoing calls to a distant office. Number translator 46 and line scanner-marker 50 are utilized to complete calls to local lines, and code translator 48, together with outgoing trunk marker 70, complete calls to outgoing trunks 72. The path finding operation of TLN control 76 includes a two step scan. A local junctor 28, or a trunk junctor 58, has been previously marked (depending upon whether the call being terminated is an incoming call or a locally generated call). In addition, the information in the local or trunk register is transmitted from the register via register common 44 to either number translator 46 or code translator 48 (again depending upon whether the call is being terminated to a local subscriber or to a distant exchange, respectively). In the event of a call terminating to a local subscriber, number translator 46 marks the line circuit of the terminating call via line scanner-marker circuit 50. In the event of an outgoing call, code translator 48 marks the particular outgoing trunk group 72 via outgoing trunk marker circuit 70. The first scan of TLN control 76 detects a free path through TLN 52 either to the marked outgoing trunk 72 or via a ringing circuit 30 and LLN 24 to a line circuit 26a–26n and identifies the E stage matrix module (the D stage matrix module is previously identified by the seized local or trunk junctor). The second scan identifies and marks the input to the F stage matrix module, completes the connection back through the D and E stage matrix modules to the marked junctor by energizing the matrix mark relay coils and also provides power through the F stage module and LLN 24 to energize the mark relay coils. After a metallic path check is made via the tip and ring leads, the sleeve connections are picked up to complete the connection through TLN 52.

The ringing control 30 now rings the called party. The connections through LLN 24 and TLN 52 and the local or trunk junctors 28 or 58 are maintained during the call under the control of the calling party. When the calling party hangs up, all connections are broken. Should the calling party still remain off-hook after the called party hangs up, provisions are included in the junctor circuits to break the connections after a predetermined period of time.

The interconnection and operation of the common control switching system are more fully described in U.S. Pat. No. 3,729,593, entitled, "Path Finding System", filed on June 15, 1971, in the names of Otto Altenburger and Robert Bansemir and assigned to the assignee of the present invention, the structural details of which are herein incorporated by reference.

When the common control system 20 is to ticket callers completing sent paid station-to-station connections, the system also includes a plurality of recording trunks 100, a toll recorder 102, a toll buffer 104, and a toll adapter 106. In addition, when ONI positions are necessitated by or desired in the system configuration, ONI links 108 and ONI trunks 110 are provided.

The recorder 102 receives all the billing information and supervisory signals that are needed to produce a permanent record of the toll charges of the system from toll buffer 104 and recording trunks 100 connected thereto. The permanent record may be in the form of magnetic or perforated tape or other recording mediums.

The recording trunks 100, which have an appearance at the F stage of the TLN and an appearance either to other external offices or to trunk junctors 58, are used in connecting calls externally or internally, respectively, and in producing supervisory signals which alert the recorder 102 when to start or stop the billing time for a call. Information data which contains the called number and calling number along with other supervisory signals is transferred to the recorder 102 under control of the toll buffer 104 connected thereto.

The toll buffer 104 is used to store and reformat the toll information data sent to the recorder 102 from the registers 34, 62 via the translators register common circuit bus under direction of the register common 44. The toll adapter 106 cooperates with the register common 44 to provide toll information used in controlling the billing cycle of the buffer 104, recorder 102, and recording trunks 100. The ONI trunks 110 have an appearance at the F stage of the TLN 52 and another at the trunk junctors 58 (connected via TSLN to trunk registers 62), and operate to provide access to an operator position (usually called a CAMA position) through trunk registers 62 and ONI link 108. The AMA system illustrated has provision for billing toll records for two different types of calls, the local call (LAMA) and the tributary call (CAMA).

The local or LAMA call from a line circuit 26n to a distant office can be effected either with automatic number identification (ANI), operator number identification (ONI), or in the event of ANI failure.

The tributary or CAMA call which originates at a tributary office and terminates either at a line circuit 26n or another tributary office can also be effected either with ANI, ONI, or in the event of ANI failure.

The connections for billing the LAMA and CAMA calls within the system will now be more fully described with particular reference to FIGS. 2–5 which show pertinent portions of the block diagram of FIG. 1 illustrating the equipment used for the particular call made.

Figure 2:
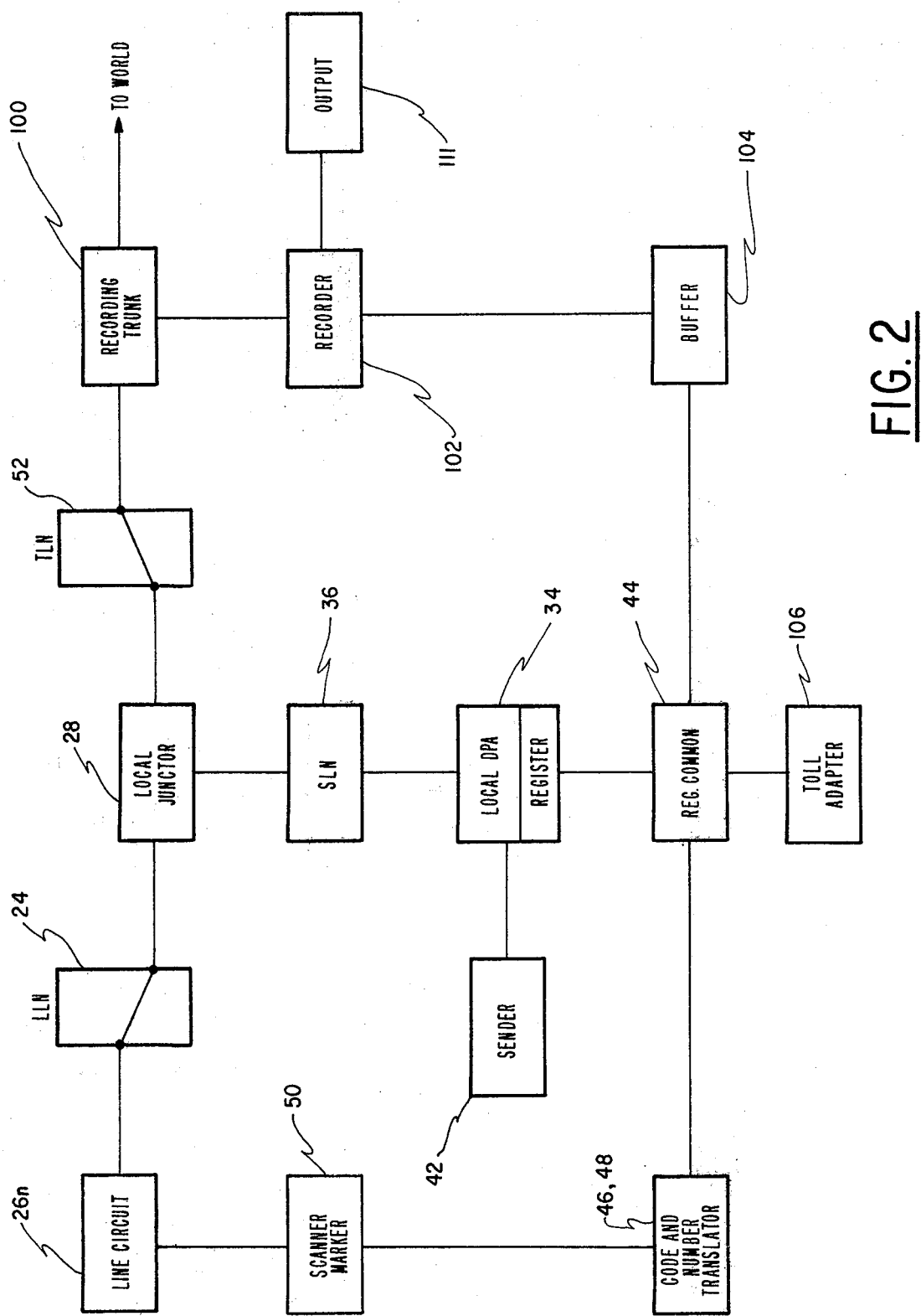
FIG. 2 is a block diagram of portions of the system and apparatus of FIG. 1 illustrating automatic toll ticketing for a local to tributary office connection with ANI.

With reference now to FIG. 2, a local-to-tributary call orginates when a line circuit 26n goes off-hook, as described above, and the off-hook condition is detected by the line scanner-marker 50. A path for connection to a local register 34 is found through the SLN 36 and the line circuit 26n connected thereto. The local register 34 next receives the equipment number of the calling line 26n from the line marker-scanner 50 and releases the line marker-scanner 50 for other connections. The local register 34 gains access to the number translator 46 during the time slot allotted to that particular 34 via register common 44 and transfers the equipment number of the calling line 26n along with an indication that this is an originating local call to the translator. The number translator 46 converts the equipment number into a directory number and transmits this data back to the register 34 with class-of-service digits for storage. The local register 34 then returns dial tone to the line circuit 26n as an indication to start dialing.

While the digits are being received from the line circuit 26n, the local register 34 forwards the stored information to the code translator 48 for periodic interpretation during the time-frame access controlled by register common 44. From the access code "1" the code translator finds that it is handling a call which requires charging. The digit "1" is now erased and a control signal indicating a DDD type of call (TOC) 5 is stored in the register 34. The remainder of the digits are received in the local register 34 and transferred to the code translator 48 for determining the destination of the call. The code translator 48 gains access to the outgoing trunk marker 70 and begins a pathfindinng operation from the local junctor 28 through the TLN 52 to a free recording trunk 100. Once a free recording trunk 100 is found, a seizure entry is (to be described in greater detail below) written into a block or cell of storage in the recorder 102 associated with the recording trunk 100. When an idle path is found between a local junctor 28 and an idle recording trunk 100 the crosspoints of the TLN 52 are closed and the stored calling and called number are transferred to the toll buffer 104 with a type of call (TOC) digit ("5" for DDD toll charging) two class-of-service (COS) digits, and an information digit via the translator-register common data bus. The number of the connected recording trunk 100 is received, decoded by and stored in the toll buffer 104 from the marker-scanner 56. After the recording trunk number is stored, the data is sent to the same block of storage in the recorder 102 that corresponds to the connected recording trunk 100.

The called directory number is pulsed out by the sender 42 and, upon receipt of an answer supervision signal, the recording trunk 100 signals the recorder 102 to store an answer entry signal. The recorder 102 accumulates the total time of the conversation and, when the call is finished, stores a disconnect entry signal transmitted from the recording trunk 100. The recorder 102 then transfers the completed call's billing record to an output medium.

Figure 3:
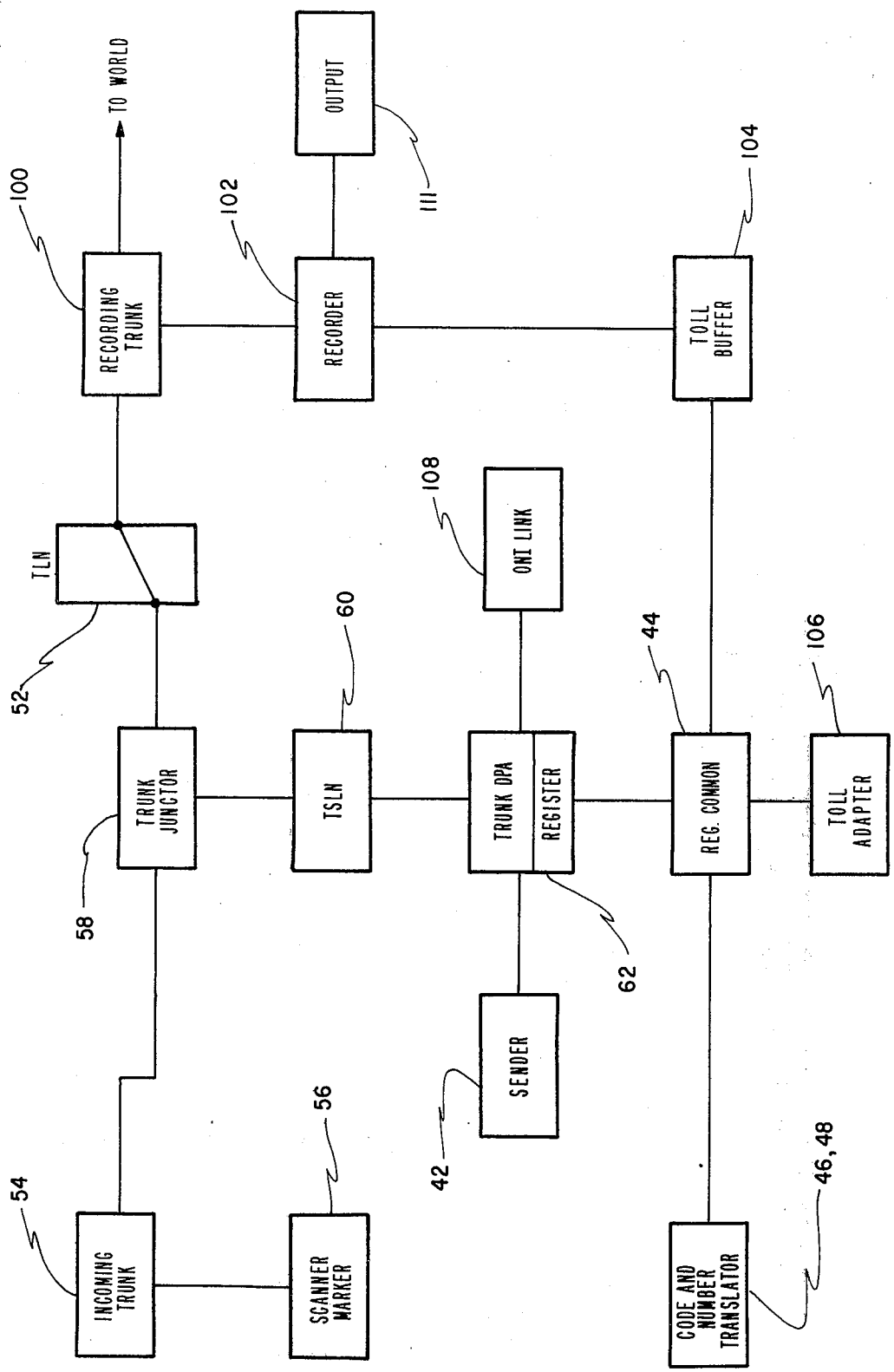
FIG. 3 is a block diagram of portions of the system and apparatus of FIG. 1 illustrating automatic toll ticketing for a tributary to tributary office connection with ANI, ONI, or ANI failure.

A tributary (CAMA) call having ANI and terminating in another office will now be described with reference to FIG. 3. An incoming trunk 54 is seized by an originating tributary office (not shown) and the seizure is detected by incoming trunk scanner 56. An idle trunk register 62 is connected to the incoming trunk 54 via the trunk junctor 58 and TSLN 60 in the standard manner and the trunk register 62 receives and stores the called number. The ANI facilities of the originating office transmit the calling directory number when the register 62 signals the called number has been stored. During the time the trunk register 62 is receiving information from the tributary office, it forwards the called and calling number digits to the translator 48 for periodic interpretation during the time-frame access controlled by the register common 44. From the access code "1" the translator 48 determines that a call that requires charging is being processed. The digit "1" is erased and a control signal indicating a DDD type of call, (TOC) 5, is stored in the trunk register 62. The translator 48 determines from the called number, area code or office code, that the call should terminate to another tributary office and starts a connection attempt to an outgoing recording trunk 100. The selection of a recording trunk 100 to which the trunk junctor 58 is to be connected via the TLN 52 is performed in a manner identical to that described before. After the path finding has been accomplished, the calling and called numbers that are stored in the trunk register 62 are transferred to the toll buffer 104 with the type of call digit (5 for DDD toll charging), two class-of-service digits, and an information digit via the translator-register common bus. The recording of the data in output from and the storage of the trunk number are identical to that described above for the local (LAMA) call. The writing of the seizure, answer entry, and disconnect entry are identical to that described before and are directed by recording trunk 100.

A tributary (CAMA) call having an ANI failure or requiring ONI capability and terminating to another office will now be more fully described with reference to FIG. 3. The tributary-to-tributary connection without ANI is identical to that described for the ANI situation except that, when the trunk register 62 signals for the calling number it is notified that the call is an ANI failure or ONI. The condition is stored in the register 62 either as 0 (ANI), 1 (ONI), or 2 (ANI failure) to be transferred to the recorder 102 later as the information digit. The trunk DPA then requests a connection to a CAMA operator through the ONI link 108. When the connection is completed, the operator requests the calling directory number and keys it into the trunk register 62 where it is stored. The ONI link 108 is then released and the toll charging and connection to an outgoing recording trunk 100 are performed as previously described for the ANI tributary-to-tributary connection.

Figure 4:
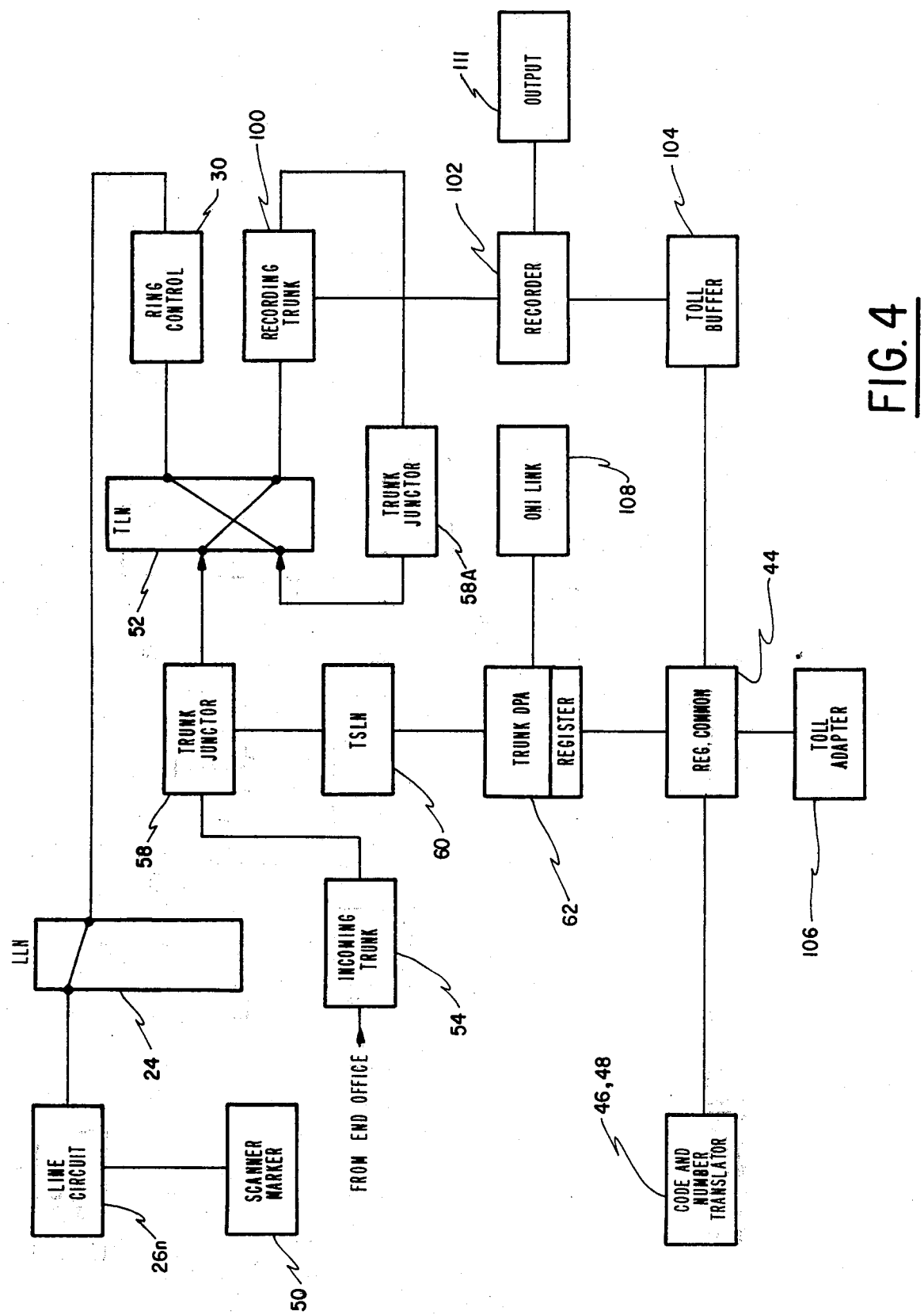
FIG. 4 is a modified block diagram of the system and apparatus of FIG. 1 illustrating automatic toll ticketing for a tributary-to-local office call with ANI, ONI, or ANI failure.

A tributary (CAMA) call having ANI and terminating in the local office will now be more fully described with reference to FIG. 4.

The process begins in the same manner as that described for the tributary-to-tributary connection with a path being established from incoming trunk 54 to trunk register 62 via TSLN 60 and trunk junctor 58. The calling and called numbers are stored in the trunk register 62 and processed by the translator periodically on a time-access basis. From the called number the translator 48 determines that the call is to be a local connection and must also be ticketed. The TOC 5 digit is stored in the trunk register 62, as described previously, and a path found between a recording trunk 100, an associated trunk junctor 58A, and the incoming trunk 54 in the same manner as the tributary-to-tributary connection. When the connection is established between trunk junctor 58A and incoming trunk 54 via trunk junctor 58 and TLN 52, the trunk register 62 transfers all the billing data to the recorder 102 via the toll buffer 104 in the manner previously described. The call may now be terminated from trunk junctor 58A by a standard trunk junctor-to-line circuit connection in which a path is determined via LLN 24, ringing controls 30 and TLN 52 by seizing the line scanner-marker 50 and marking the called line circuit 26n.

When a unique path is found by the three scan processes, the matrix crosspoints are operated and ringing is applied to the called line 26n. If in this situation, ANI failure should occur or ONI is required, the process described above also includes the steps of notifying the trunk register 62 of the particular condition when the calling number is asked for. A path between the incoming trunk 54 and the ONI link 108 is then established as described above in connection with the tributary-to-tributary with ONI connection and the call then proceeds as described before once the CAMA operator has keyed the number into the trunk register 62.

Figure 5:
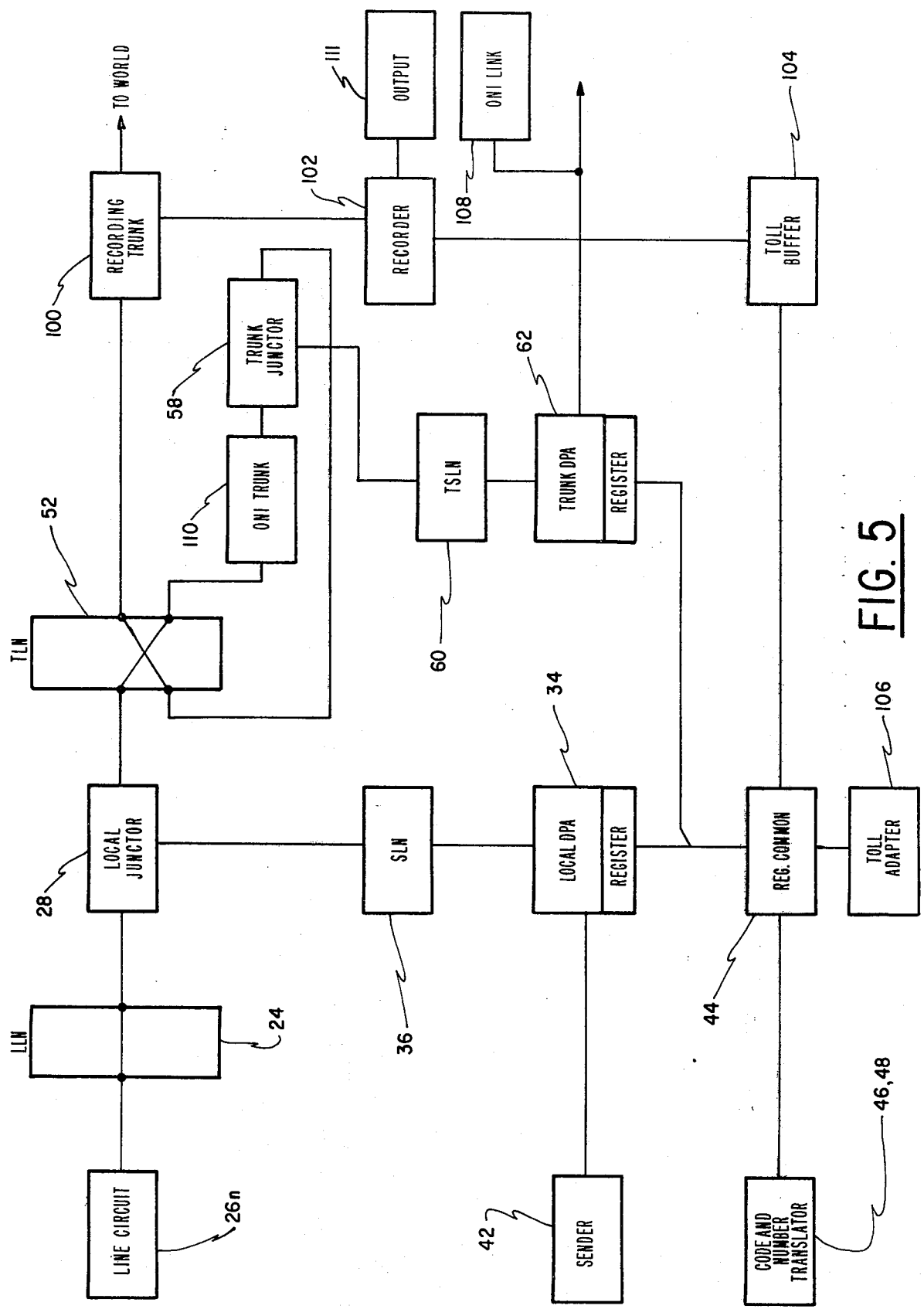
FIG. 5 is a block diagram of portions of the system and apparatus of FIG. 1 illustrating automatic toll ticketing for a local-to-tributary office connection with ONI or ANI failure.

A local (LAMA) call needing ONI or ANI failure capability will now be more fully described by reference to FIG. 5. Operator number identification is needed in the case of multiparty lines without ANI facilities. The call is originally processed in the manner described above for a local-to-tributary call with ANI. The line circuit 26n is connected to the local register 34 via SLN 36, local junctor 28, and LLN 24. However, from the class-of-service of the calling party and the DDD access digit "1" the code translator 48 recognizes the call must be ticketed and ONI is needed and the translator 48 begins a connection to an ONI trunk 110. A path is established to trunk junctor 58 through ONI trunk 110 via the TLN 52. An idle trunk register 62 is requested and, when a free trunk register 62 is found, the path is completed from local register 34 to trunk register 62. After the connection has been effected, the trunk register 62 requests the identity of the called number which is outpulsed by the sender 42 of the local register 34. After the called number is stored in the trunk register 62, the calling number is requested and the trunk register 62 is notified that the call is an ONI or ANI failure type. The trunk register DPA establishes a connection to the ONI link 108 and requests the subscriber directory number from the calling party which is then stored in the trunk register 62. The process of billing and connection to the recording trunk 100 through the TLN 52 is the same as that described above for the tributary-to-tributary connection.

Toll Buffer

The operation and description of the toll buffer 104 will now be more fully explained with reference to FIGS. 6–14.

Figure 6:
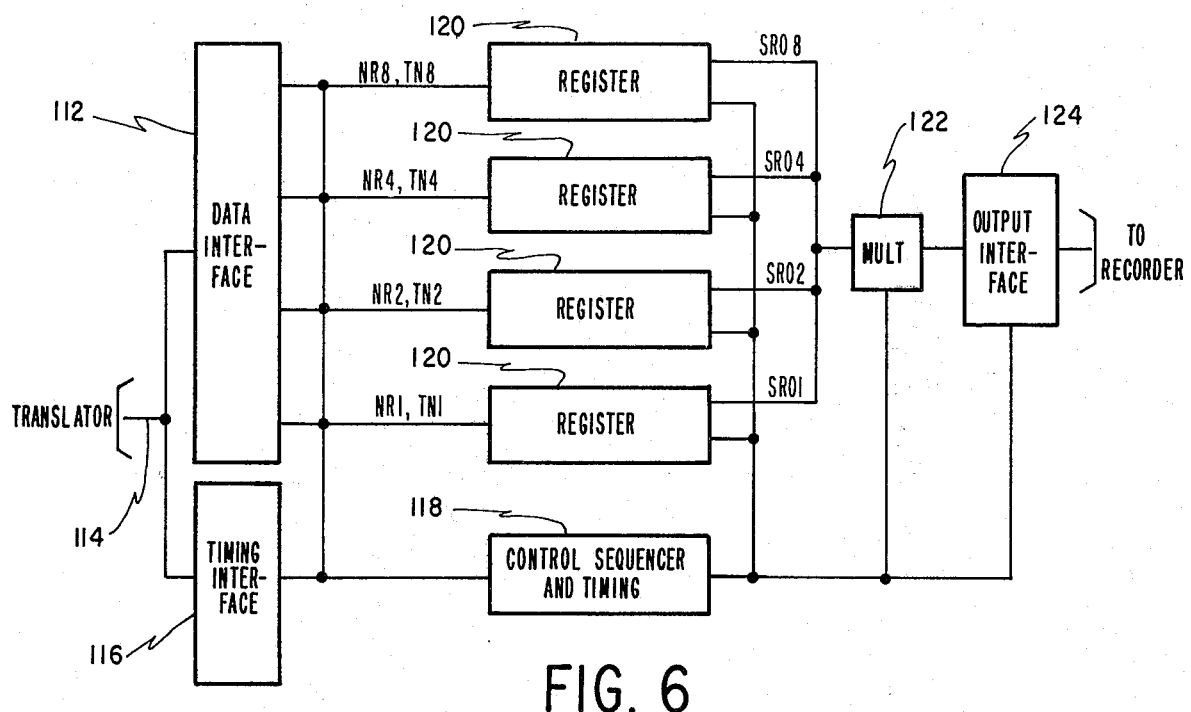
FIG. 6 is an expanded block diagram of the toll buffer illustrated in FIG. 1.

The block diagram in FIG. 6 shows the toll buffer 104 which includes a data interface circuit 112 connected to translator-register common bus 114, and a timing interface circuit 116 also connected to the bus 114. A control sequencer 118 is provided for loading input information from the data interface circuit 112 into four shift registers 120 each having 30 bits of storage. Toll buffer 104 also has a multiplexer 122, connected to the control sequencer 118 and registers 120, and an output interface 124 for outpulsing information to the recorder 102. The buffer registers 120 receive data in parallel four bit digits over lines NR1, NR2, NR4, NR8, corresponding to a register message and lines TN1, TN2, TN4, TN8 corresponding to trunk numbers. The data is loaded under the control of the control sequencer 118, reformatted, and output serially by multiplexer 122 to the output interface 124. The input format and output format of the data are shown in FIG. 8.

Figure 7:
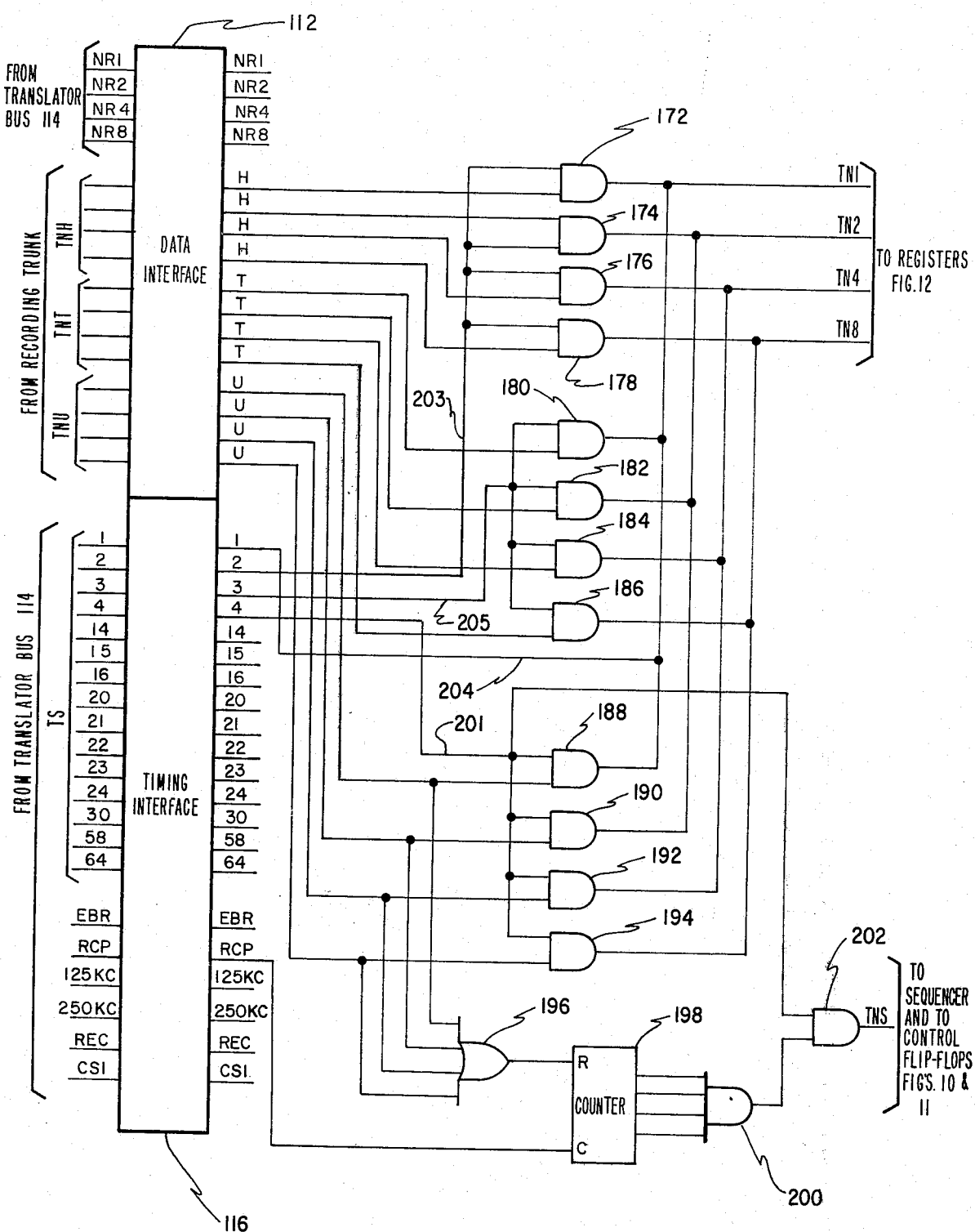
FIG. 7 is a detailed schematic of logic circuitry comprising the data and timing interface illustrated in FIG. 6.

The data interface 112 and timing interface 116 includes a plurality of input and output circuits which are shown in detail in FIG. 7.

The data interface 112 includes translator register common bus lines NR1, NR2, NR4, NR8 on which appear the data from the register storage in the input format illustrated in FIG. 8. Each digit is a four bit character that appears in parallel on the data lines NR1, NR2, NR4, NR8 at the time slot indicated.

The data interface 112 also receives the recording trunk number, found from the trunk selection process, on lines TNH, TNT, TNU. The trunk number is a three character BCD number having a hundreds character TNH, a tens character TNT, and a units character TNU. The trunk number appears on these lines as soon as the trunk selection process is completed and remains until the recording trunk 100 is released. Each recording trunk 100 is assigned a unique number and forms part of a group assigned to a section of the recorder 102.

The trunk number THN, TNT, TNU is reformatted by gates 172–194 into a four character number which appears on lines TN1, TN2, TN4, TN8 at time slots TS1, TS2, TS3, TS4, respectively. At TS1, the first character is presented by line 204. At TS2, gates 172–178 are enabled via line 203 to permit the TNH character to appear in lines TN, TN2, TN4, TN8. Similarly, at TS3 and TS4, gates 180–186 and gates 188–194 are enabled via lines 205 and 201, respectively to permit the TNT, TNU characters of the trunk number to appear on lines TN1, TN2, TN4, TN8. The appearance of the trunk number also resets a counter 198 by enabling a gate 196 before the number is read out on the data lines TN1–TN8. The counter 198 is incremented by a signal RCP transmitted from the register common 44 via the translator bus 114 synchronously with the TS signals for storing the number of characters sent. The output of the counter 198 is decoded in gates 200, 202 during TS4 and, when all the characters have been transmitted, a trunk number sent (TNS) signal is generated.

The timing interface 116 is used to provide a plurality of the time slots (TS) used by the common control for the control of the sequencer 118.

As will be described in greater detail below with reference to FIGS. 9 through 14, the time slots 1–4, 14–16, 20–24, 30, 58, 64 are used to synchronize the data read into the registers 120 against that presented on the translator register common bus 114. In addition, two high speed clock signals 125KC and 250KC are transmitted from the translator 48 and ultimately used to make composite input and output clock signals for the shift registers. The timing interface 116 also receives the system control signals EBR, RCP, REC and CSI from the translator common bus 114.

Figure 12:
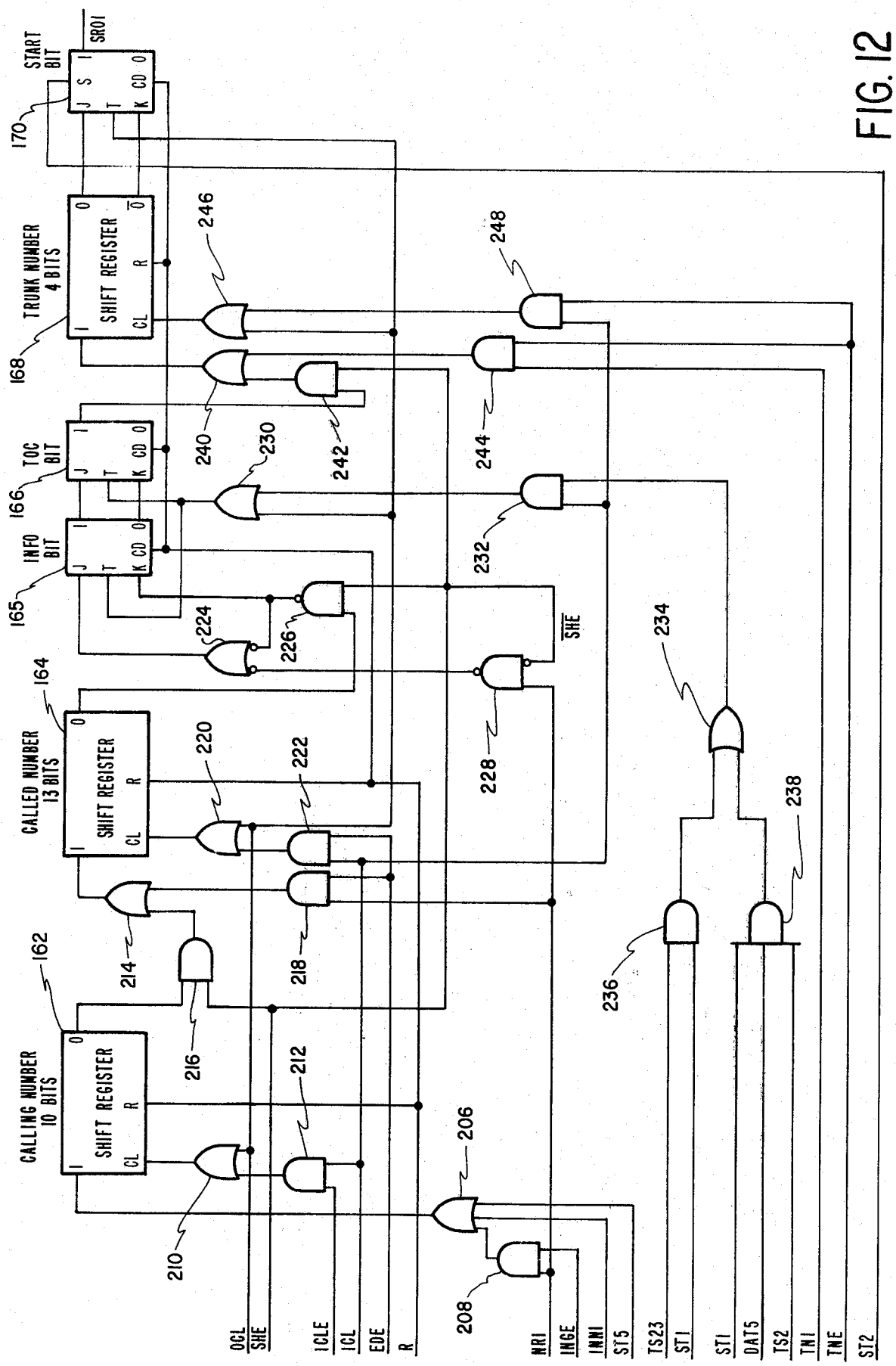
FIG. 12 is a detailed schematic diagram of logic circuitry for a register illustrated in FIG. 6.

The shift registers 120, which are provided for receiving information pertaining to a toll ticketing call, will now be described in more detail with reference to FIG. 12. Only one of the four 30 bit registers is shown in FIG. 12 as the other three are identically connected in parallel with the register 120 illustrated. Each register 120 includes a 10 bit calling number register 162 for storage of the calling number, a 13 bit called number register 164 for storage of the called number, a single J–K stage 165, for storage of the information bit, a single J–K stage 166 for storage of the TOC bit, a four bit recording trunk number register 168 for storage of the trunk number, and a J–K stage 170 for storage of the start bit.

The calling number register 162 is loaded with data at its input I via a gate 206 by information on three lines NR1, via a gate 208, and directly from lines INN1 and ST5. Gate 208 is enabled by a calling data enable (INGE) signal from FIG. 11. The register 162 is shifted either by the input clock (ICL) signal transmitted via a gate 212 enabled by the input clock enable signal (ICLE) or by the output clock (OCL) signal transmitted via a gate 210 to the CL input. The shift register 162 is reset by a reset (R) signal transmitted to the R input.

The called number register 164 is loaded with data at its input I via a gate 214 by information on lines NR1 via a gate 218 or by the output O of the calling number register 162 via a gate 216 and the gate 214. Gate 216 is enabled by a shift enable signal (SHE) and gate 218 is enabled by a called data enable (EDE) signal. The called number register 164 is shifted either by the ICL signal via a gate 222 (enabled by EDE) or by the OCL signal through a gate 220 to the input CL. An R input signal is used to reset the called number register 164.

The information and TOC bit stages 165 and 166 are loaded with information at inputs J–K through gates 224 and 226, respectively, by information on lines NR1 via a gate 228 and by the output O of the called number register 164 via the gate 226. The SHE signal enables the gate 226 and inversion of the SHE signal enables the gate 228. The signal ICL transmitted via a gate 232 or the signal OCL transmitted through a gate 230 are used to shift the two register stages 165 and 166. The signal ICL is enabled when gates 234, 236 and 238 decode the coincidence of either the TS23 and ST1 signals or the STO, DAT5 and TS2 signals. Both stages 165 and 166 are reset by the signal R to the clear direct (CD) input.

The trunk number register 168 is loaded with information at its input I through a gate 240 by information transmitted over a line TN1 via a gate 244 or by the output of register stages 165, 166 via a gate 242. Gates 242 and 244 are enabled by the signals SHE, TNE, respectively. The trunk number register 168 may be shifted by the input clock (ICL) via a gate 248 or by the OCL signal through a gate 246. The signal TNE is used to enable the gate 248. The trunk number register 168 is reset over line R.

The start bit stage 170 of the four registers 120 may be set by the ST2 signal to any four bit binary representation. For different registers 120 different combinations can be effected by selectively connecting the ST2 line to the S or CD inputs. Usually the start bit is 13 or 1101 binary. The start bit stage 170 is clocked by the signal OCL and reset by the signal R.

The following signals/lines shown in FIG. 12 are connected to circuitry shown in other Figures, as shown below:

| Signal/Line | Connected To: |
| --- | --- |
| OCL, SHE and SRO1 | Output Multiplexer 122 (Figure 14) |
| ICLE, ICL, R, EDE, INGE and TNE | Control Flip-Flops (Figure 11) |
| ST1, ST2, ST5 and DAT5 | Control Sequencer (Figure 10) |
| TS2, TS23 and TNI | Data Interface (Figure 7) |
| INN1 | COS Decoder (Figure 14) |

Figure 10:
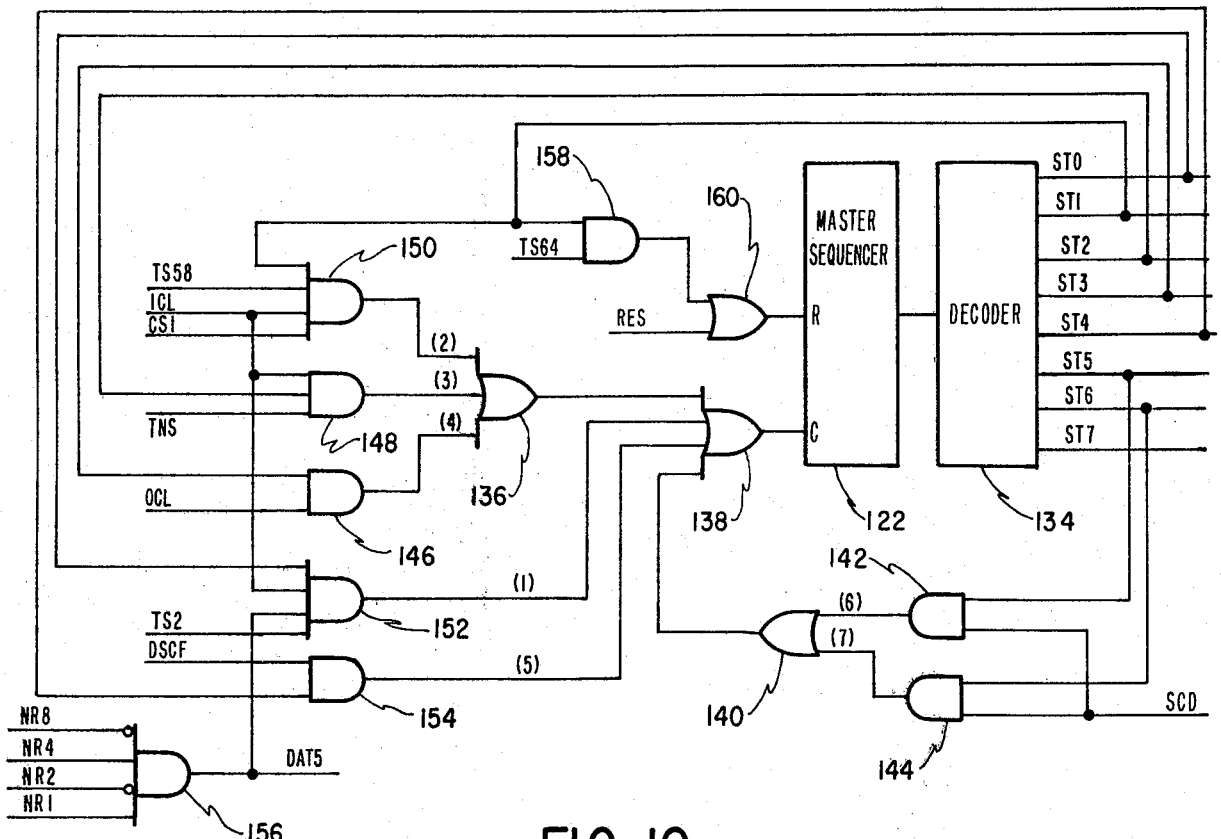
FIG. 10 is a detailed schematic diagram of logic circuitry for the master sequencer of the control sequencer and timing circuit illustrated in FIG. 6.
Figure 11:
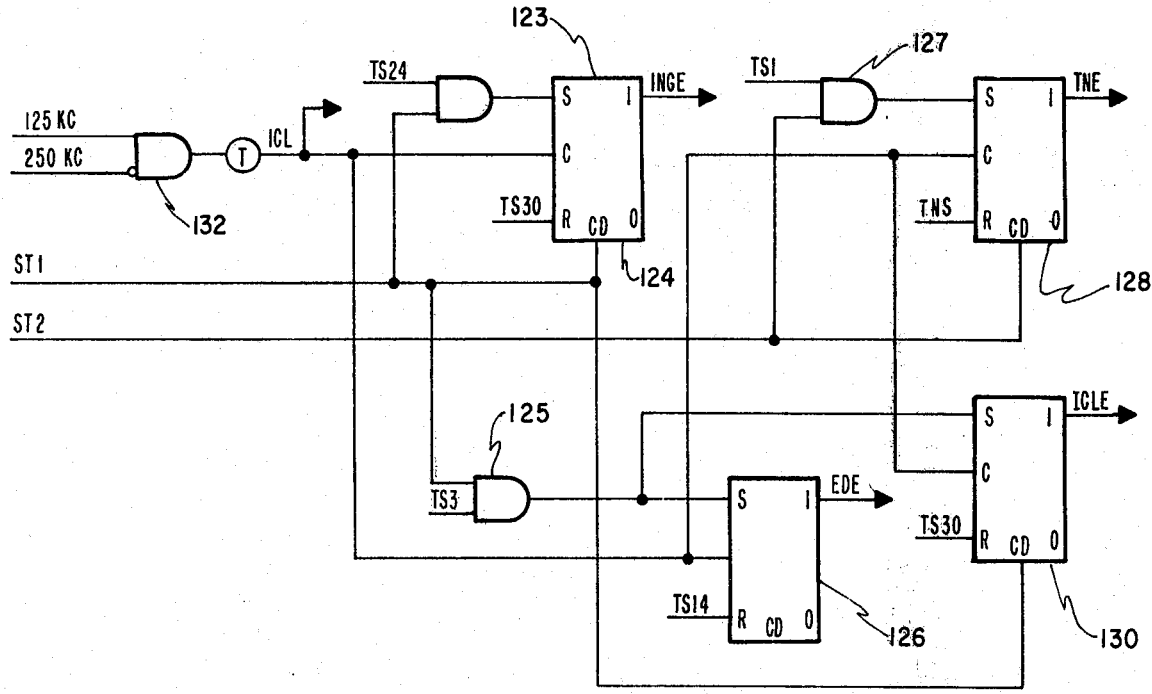
FIG. 11 is a detailed schematic diagram of logic circuitry for the control flip-flops of the control sequencer and timing circuit illustrated in FIG. 6.

The shift registers 120 are under the control of the control sequencer 118 which includes a master sequencer 122 having eight output control states STO–ST7 for directing the toll buffer 104 (shown in FIG. 10) and four control flip-flops 124, 126, 128 and 130 that are labeled INGE, EDE, TNE, ICLE, respectively, as illustrated in FIG. 11. An input clock (ICL) signal is also provided in the control sequencer 118 by combining the 125KC clock signal and the inverted 250KC clock signal in gate 132 and delaying the output by a slight increment, T. The slight delay is provided to allow the data to settle on the transistor bus 114, before being clocked into the shift registers 120.

The master sequencer 122 has associated therewith a decoder 134 which presents its eight states sequentially on lines ST0-ST7 to permit the toll buffer 104 to progress through its functions. The master sequencer 122 is incremented through states 0–7 by count gates 142–154 supplying a signal to the C input of the sequencer 122 via OR gates 136, 138 and 140. The state to which the coincident inputs of the count gates 142–154 advance the sequencer 122 are indicated in parenthesis at the outputs of the respective gates. Gates 158 and 160 are arranged to apply a signal to the R input of the sequencer 122 to reset the master sequencer 122 to count ST0, as will more fully be described hereinafter.

During state 0 (ST0) the toll buffer 104 is idle, waiting for an image message. When a local or trunk register is ready to send a message, during its access time, the TOC 5 signal, that was stored in the register, as explained earlier, appears on the data bus NR1-8 during TS2. The TOC5 digit is then decoded by the gate 156 to provide a data 5 (DAT5) signal to the gate 152. When gate 152 decodes the coincidence of DAT5, TS2, ST0, and ICL, gate 152 has an output signal to increment the master sequencer to ST1.

The ST1 signal clears the flip-flops 124, 126 and 130 to prepare for the loading of data into the shift registers 120 in the input format shown in FIG. 8.

With reference to FIG. 12 once again, during TS2 the TOC digit 5 appears on the data lines NR1-8 and is loaded into stage 165 by enabling ICL during TS2 and ST1 via gates 232, 234 and 238. When the next time slot, TS3, occurs, the flip-flops 126 and 130 (FIG. 11) that generates the called data enable (EDE) signal and the input clock enable signal (ICLE) are set by gate 125. The signal EDE enables the input clock (ICL) via gates 222, 220 to register 164 to shift in the called line number on line NR1. The EDE flip-flops 126 is reset during TS14 after the called number has been fully loaded.

Figure 13:
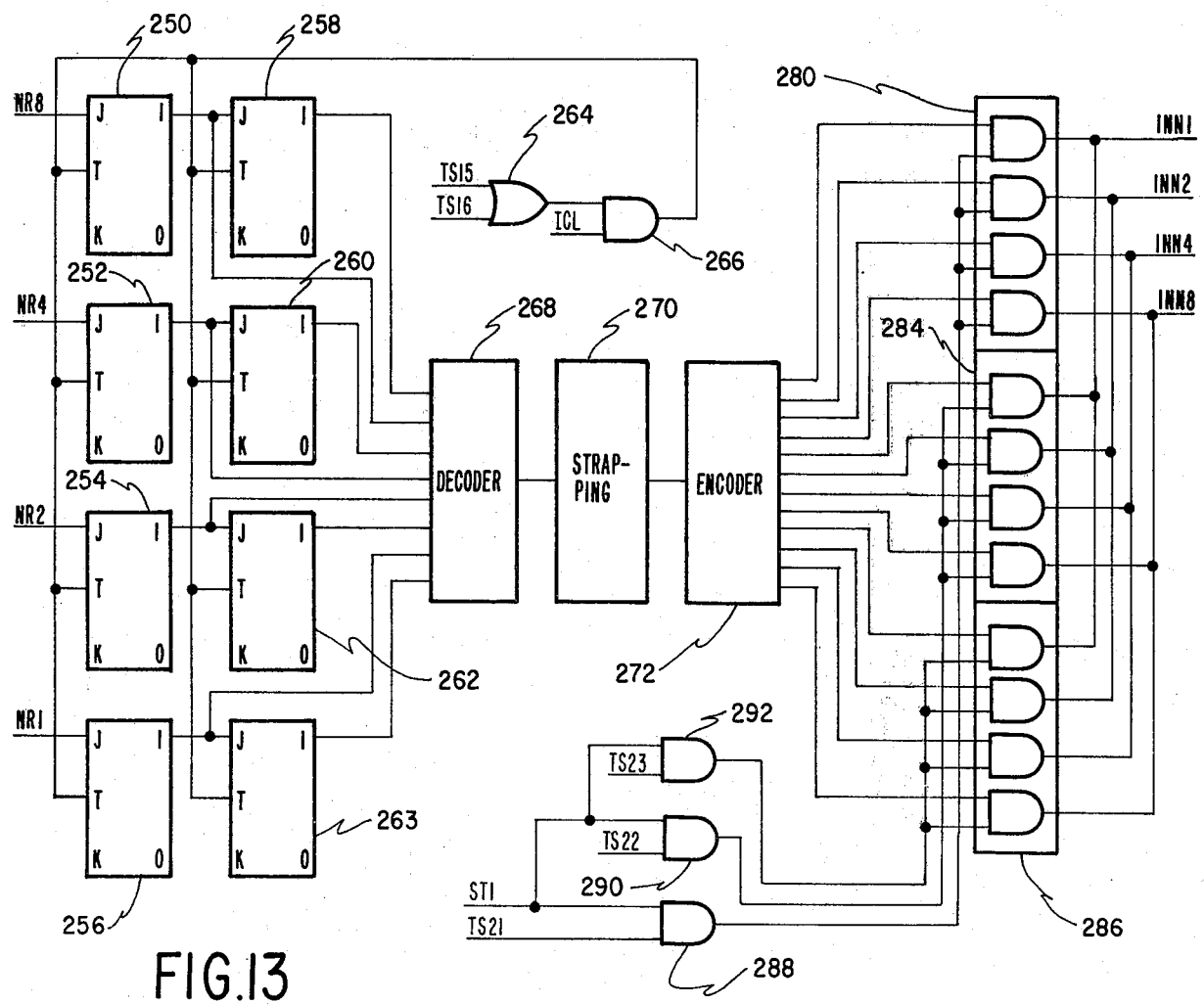
FIG. 13 is a detailed schematic diagram of logic circuitry providing the trunk decoding function of the control sequencer and timing circuit illustrated in FIG. 6.

Turning for a moment to FIG. 13, there are shown a plurality of intermediate storage registers 250–263 for receiving input information from the data lines NR1-8. The intermediate storage registers 250–263 are enabled to clock the two class-of-service COS digits into storage during TS15 and TS16 via gates 264 and 266. Once the COS digits (X, Y) are stored, they are decoded into their decimal representation by a decoder 268. These representations are connected to an encoder 272 via a strapping circuit 270 which permits the two COS digit to be changed into any arbitrary three digit area code that is strapped. The new area code is transmitted from the encoder 272, INN1-8 character by character during TS21, 22 and 23 by means of gates 280–292.

Returning now to FIG. 12 (which shows circuitry corresponding to one register 120), the area code characters are input to calling number register 162 via gate 206 during TS21, 22 and 23 since the input clock (ICL) to the register 162 is still enabled by the ICLE signal. TS23 input clock signal ICL to registers 165 and 166 is enabled via gate 232, 234 and 236 to permit the information bit to be loaded via gates 244, 228 and line NR1. TS24 now occurs and sets the flip-flop 124 (FIG. 11) to generate the calling data enable (INGE) signal. The calling number appearing on the line NR1 is now shifted into the calling number register 162 via gates 208 and 206 during TS24-30 by the ICL signal via gates 212 and 210. During TS30 both the INGE, ICLE flip-flops 124, 130 are reset after the calling number has been fully loaded. The toll buffer 104 now waits for a switch forward signal (CSI) from the translator 48, which indicates a connection is being made to a recording trunk 100 and, if the CSI signal is present at gate 150 (FIG. 10) before TS58, will advance the sequencer 118 to ST2. If the CSI signal does not appear (indicating a connection cannot be found or completed), the sequencer 122 returned to idle or ST0 via gates 158, 160 on the occurrence of TS64.

When the sequencer 118 is advanced to ST2, the trunk number enable (TNE) flip-flop 128 (FIG. 11) is set during TS1, which allows the trunk number appearing on TN1-8 to be read into the registers 120 during TS1-4. Signal TNE enables the gate 248 to provide the input clock signal ICL to register 168 via gate 246 and enables the gate 244 to provide data from the line TN1 (and lines TN2-8 in the other registers 120) via gate 240. The TNE flip-flop 128 is then reset by the trunk number stored signal (TNS). The ST2 signal further sets or resets the start bit stage 170 to produce the start character.

After the trunk number is stored, the gate 148 (FIG. 10) advances the sequencer 122 to ST3.

In the ST3 state, the toll buffer 104 waits to synchronize with the output clock (OCL) signal and, on the next output pulse OCL gate 146 (FIG. 10) advances the sequencer to ST4.

In state four (ST4) the output clock (OCL) shifts the register 120 in concatenated form as four 30 bit registers. Signal SHE enables the output from one part to define the input of the next part of the register chain. The 30 output characters appear sequentially on shift register output lines SRO1, SRO2, SRO4, SRO8. From the manner in which the registers were loaded, it will be seen that the output will be in the output format of FIG. 8. Each character that appears on the shift register output lines SRO1-8 is then multiplexed by the output multiplexer 122 to form a serial output to the recorder 102.

Figure 14:
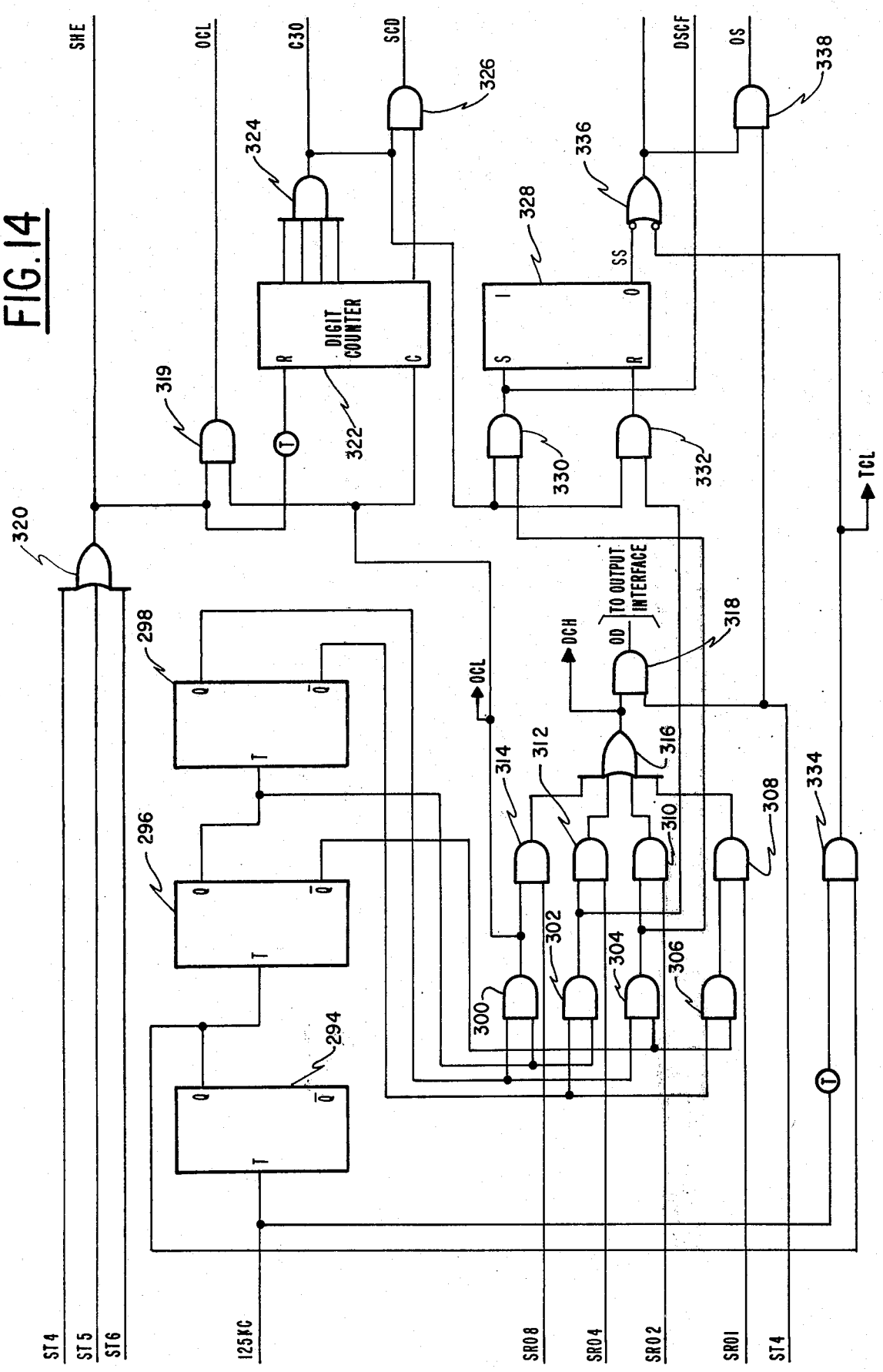
FIG. 14 is a detailed schematic diagram of logic circuitry for the multiplexer illustrated in FIG. 6.

With reference now to FIG. 14 there is illustrated the output multiplexer 122 which includes flip-flops 294, 296, 298 and gates 300–318 connected as shown. The flip-flops 294, 296, 298 are connected to define a three stage frequency divider and are clocked with the 125KHZ signal from the timing interface circuit 116.

The gates 300–306 decode the states of stages 296, 298 as (11, 10, 01, 00), respectively, and enable the gates 308–314 in order, thereby passing output data (OD) as a serial bit stream to the output interface 124 via gates 318 and 316.

The output clock (OCL) signal is generated by the gate 319 from the decoded output of gate 300 and the combination of the ST4, 5, 6 signals in gate 320. The gate 320 also generates the shift enable signal SHE.

A digit counter 322 records the number of character outputs on the output data line OD. The counter is incremented by the output of gate 300 after each four bits of a character are serialized and is reset at the beginning of states ST4, 5, and 6.

Gates 324 and 326 are connected to the output lines of the digit counter 322 and decode the outputs of the counter to provide a count 30 (C30) and a count 31 or shift count done (SCD) signals respectively. The C30 signal is combined with the output of a gate 330 to develop a data shift count finished (DSCF) signal. The DSCF signal sets a flip-flop 328 at the end of the data shift out to produce a stop strobe (SS) signal which is transmitted to the recorder 120 via gates 338, 336. Along with the information sent during ST4 the recorder 102 receives an output strobe signal (OS), against which to synchronize the data, via gates 338, 336, 334 and the SS output signal (of the flip-flop 328) is provided to indicate the end of a message. The flip-flop 328 is reset on the next output of the frequency divider via the gate 302 for the termination of the SS signal.

The DSCF signal is also used to increment the master sequencer 122 to state 5 via gate 154 (FIG. 10). During ST4, when the registers 120 clock data to the recorder 102, the registers are back-filled with zeros. In state 5, the registers 120 are shifted to output the zeros as a data check (DCH) signal via gate 316 (FIG. 14) and are back filled with ones from signal ST5 via gate 206 (FIG. 12). When the gate 326 signals the shift count is done (SCD), the sequencer 122 is incremented to ST6 via gate 142 (FIG. 10). The ones then become the DCH signals as the registers 120 are again shifted until the gate 326 decodes a shift count done (SCD) condition. When the SCD signal occurs, the sequencer 122 is incremented to ST7 via the gate 144 and the sequencer 122 idles in ST7 until it receives a translator release or reset signal (RES) via gate 160. When the output of the decoder 134 returns to STO, the toll buffer 104 will be able to handle other register requests as they arise.

Figure 9:
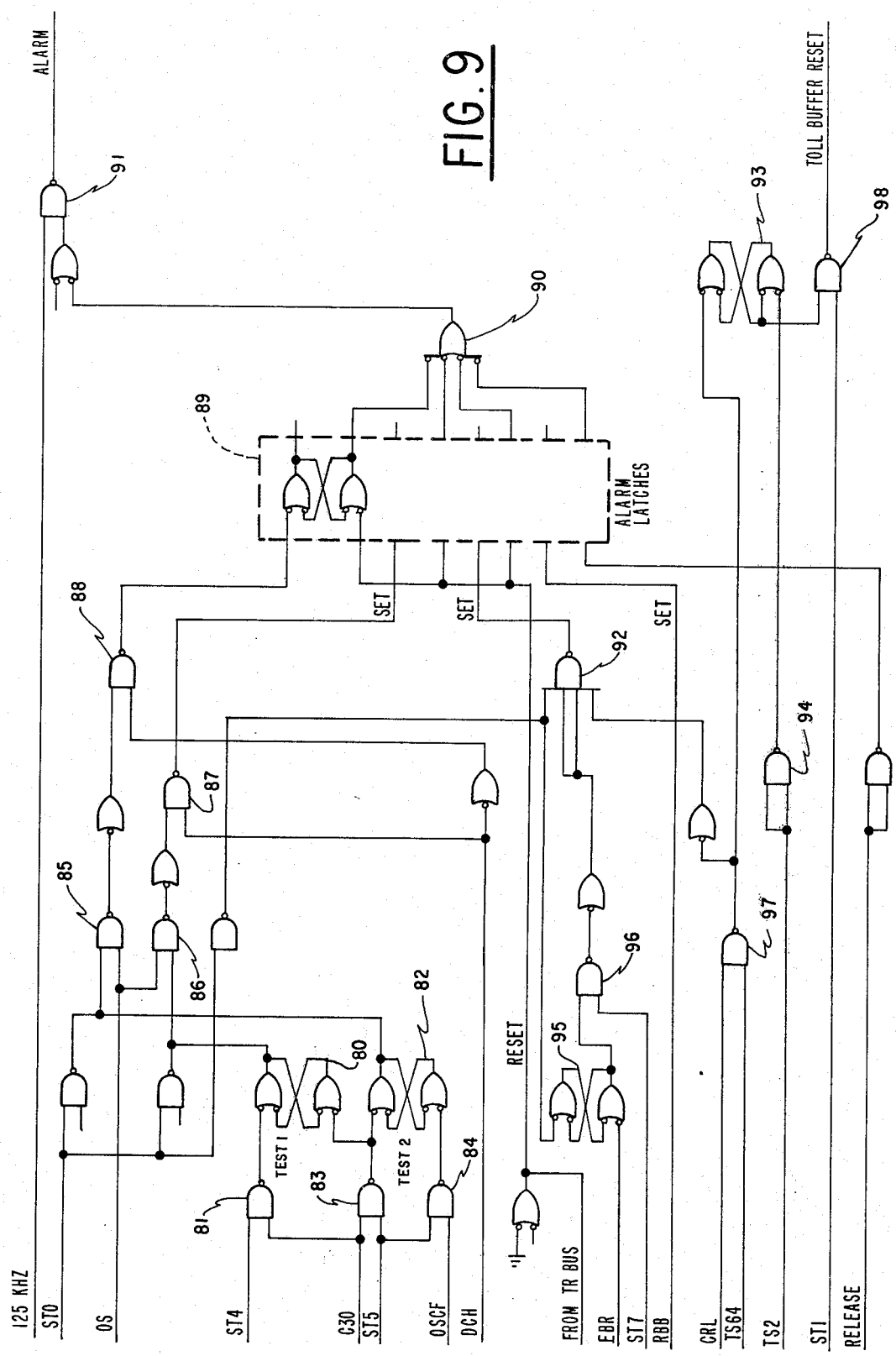
FIG. 9 is a detailed schematic diagram of logic circuitry providing the resetting and fault indications functions of the control sequencer and timing circuit illustrated in FIG. 6.

With reference now to FIG. 9 there is illustrated the alarm and resetting circuitry for toll buffer 104. The four alarm latches 89 are each set by signals indicating fault conditions and enable alarm gate 91 via gate 90 to provide an alarm signal to the common control. The first two alarms are set by a "ones" and "zeros" shift test failure. As described before, the DCH signal is generated to provide all "zeros" during ST5 and all "ones" during ST6.

A test 1 flip-flop 80 is set via gate 81 by ST4 and C30 and enables gate 87 via gate 86 to test for "zeros" in the DCH signal. A test 2 flip-flop 82 is set via gate 83 by ST5 and C30 (resetting 80) and enables gate 88 via gate 85 to test for "ones" in the DCH signal. FF 82 is reset via gate 84 at ST5 and DSCF.

Another alarm latch is set by gate 92 via gate 96 if an EBR signal is stored in latch 95 at the end of ST7 indicating that a recording trunk was not found and information was transferred in error. The last latch is set by a signal RBB from recorder 102 indicating the toll buffer 104 has transferred information to the recorder 102 while busy. FF 93 provides a toll buffer reset at CRL and TS64 via gate 98.

Recorder

Figure 15:
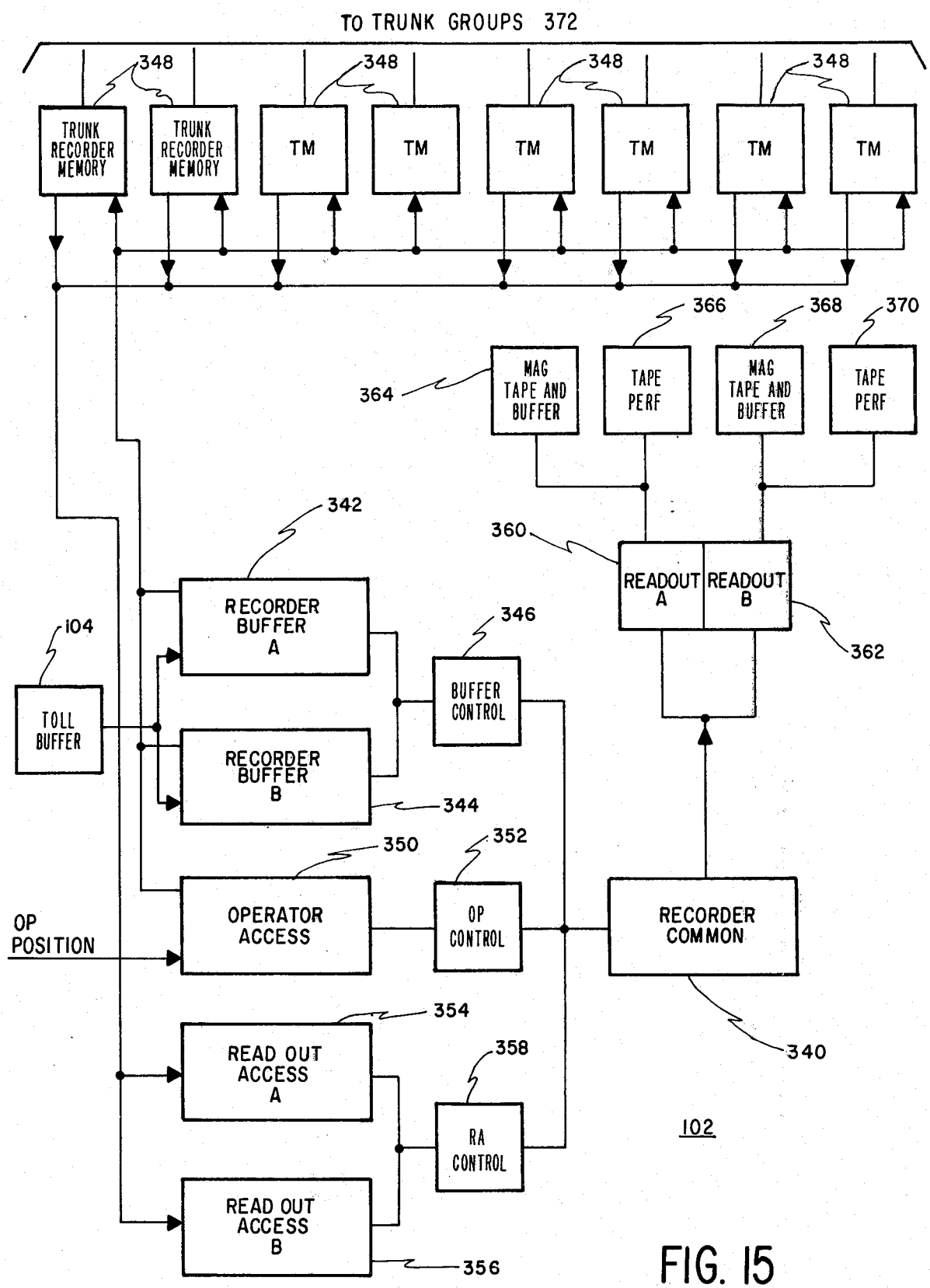
FIG. 15 is a detailed block diagram of the recorder illustrated in FIG. 1.

The construction and operation of the recorder 102 shown in a detailed block diagram form in FIG. 15 will now be more fully explained.

The recorder 102 comprises a plurality of speed buffers 342, 344, 350, 354, 356 which are arranged to be controlled by control circuits 346, 352, 358 under the direction of a recorder common 340. The buffers 342, 344, 350, 354 and 356 provide for the transmission of billing data from the telephone system to a plurality of trunk recorder memories 348 and for the transmission of billing data from the memories 348 to readout circuits 360, 362, having magnetic tape and buffer circuits 364 and 368, respectively, and tape perforation circuits 366 and 370, respectively.

The recorder common circuit 340 controls each of the plurality of trunk recorder memories 348 each of which has a storage block or cell dedicated to each recording trunk 100 of a trunk group 372 which they serve. The information stored in the trunk recorder memories 348 is constantly recirculated in synchronism with a search for trunk requests from the trunk group 372 associated therewith.

When a call is to be ticketed, the toll buffer 104, as described earlier, is loaded with toll data during timing periods ST1 and ST2 and transmits the same during period ST4.

The recorder buffer (A) 342 receives the signal input from the toll buffer 104 under control of buffer control 346 and then allows the toll buffer 104 to return to idle. The buffer (A) 342 then times the data received from the toll buffer 104 into synchronism with recirculating trunk memories 348. Once the information is in synchronism, the trunk number of the connected recording trunk 100 is compared to the trunk numbers (generated by counter circuitry in the memories 348 and corresponding to the trunks to which the particular cells are dedicated) indicating which memory cell is presently ready to have information stored therein. When an identity is found in the comparison, the information stored in the recorder buffer (A) 342 is transferred to the proper cell of memories 348 associated with the recording trunk 100 servicing the toll call. The recorder buffer (B) 344 operates in a similar manner to recorder buffer (A) 342 to provide redundancy for the system and may be switched into operation by the control 346 upon the failure of buffer (A) 342.

After the message has been stored in the proper memory block or cell of memories 348, the common control portion of the system generates a switch-through signal and the called party's line is rung. Once the called party answers, the seized recording trunk 100 sends an answer entry pulse to the trunk recorder memory 348 for storage therein. During the time the information is stored in memory 348 it may be added to or deleted from by means of an operator access circuit 350 under direction of operator control 352.

After the answer entry pulse bit is written into the storage cell, a calender group of words is entered from the recorder common 340 for recording the date of the cell and an elapsed time counter (not shown) is begun. When either the calling or the called party goes on hook, signifying the completion of the toll call, the recording trunk 100 initials a stop charging signal to the trunk recording memory 348. If the called party is on hook, the answer entry bit is erased from the recording memory 348. If the calling party is on hook, the seizure entry bit is erased. Once the memory 348 detects that counter and calender information is present in storage and the answer entry or seizure entry bits are not, the trunk recorder memory 348 requests a free readout circuit 360 or 362 via access circuits 354 and 356 which share a readout access control circuit 358.

Figure 16:
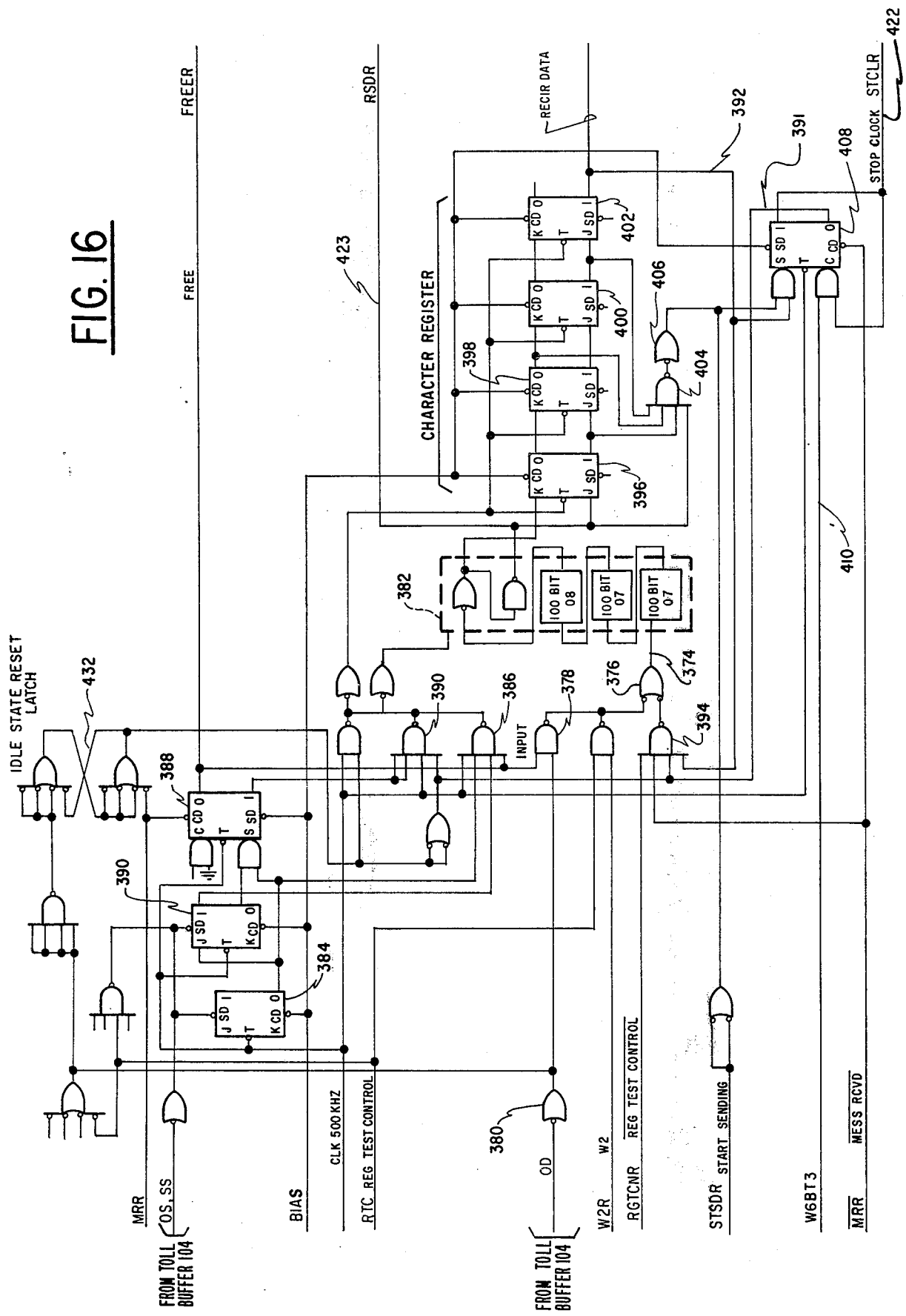
FIGS. 16 and 17 are detailed schematic diagrams of logic circuitry for the recorder buffer illustrated in FIG. 15.
Figure 17:
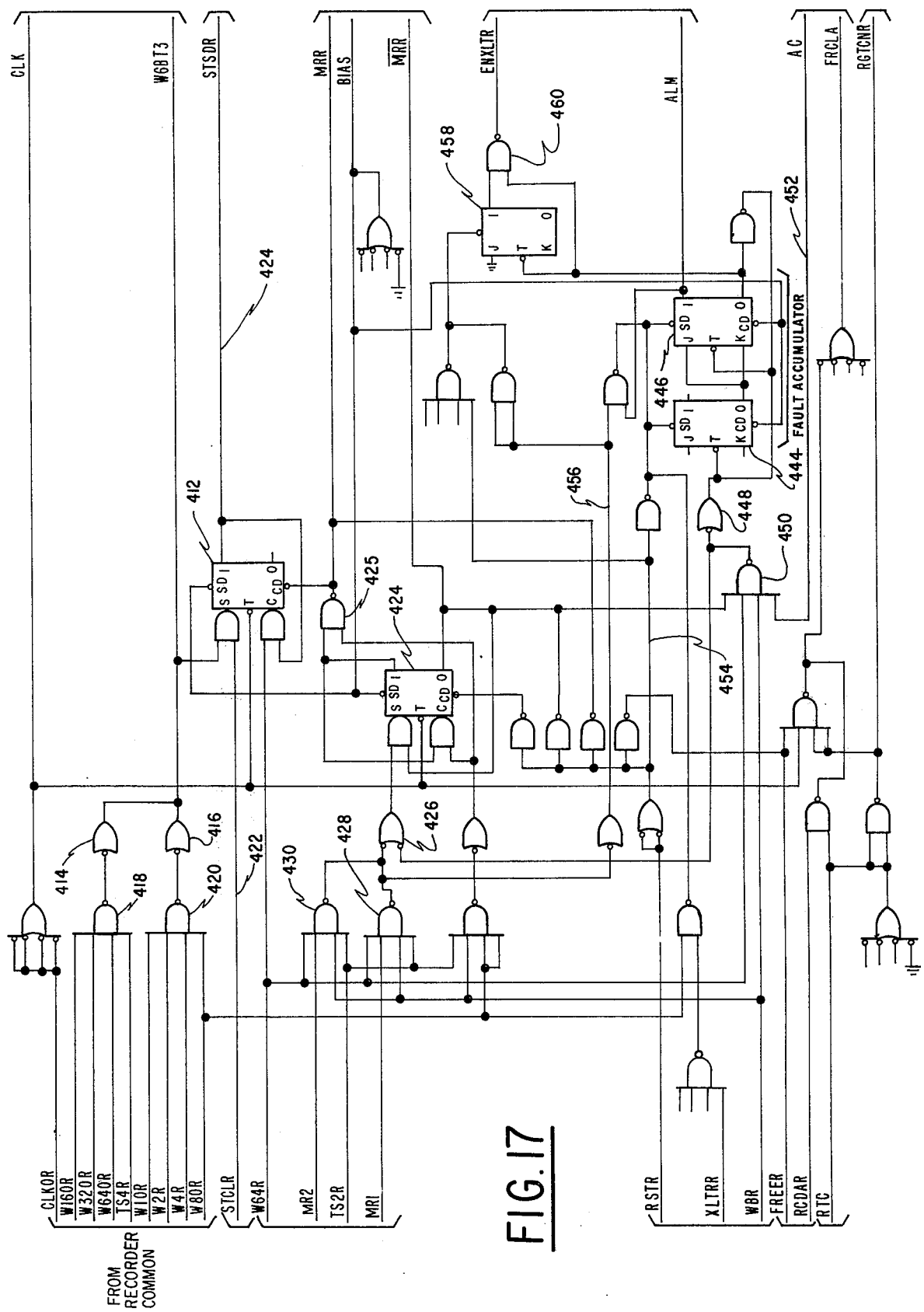
Figure 25:
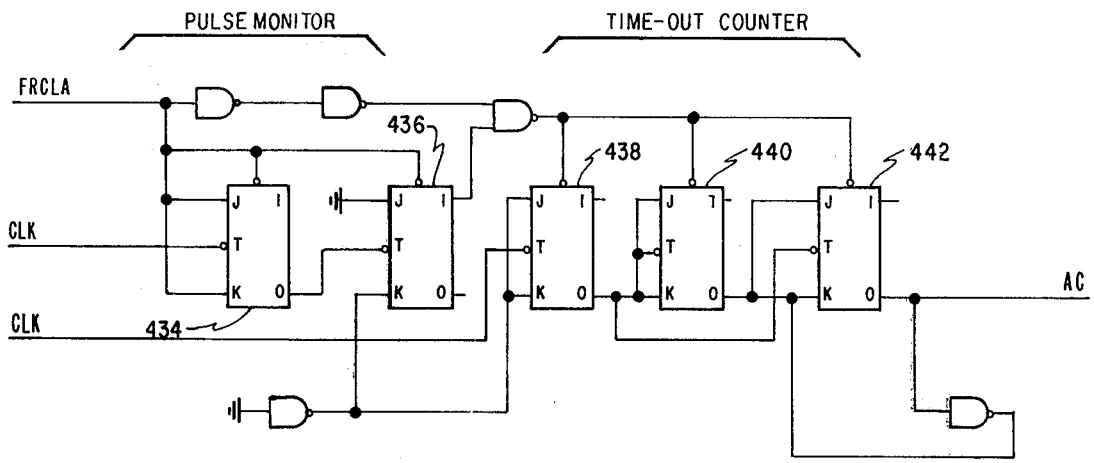
FIGS. 23 and 25 are detailed schematic diagrams of logic circuitry of the recorder operator buffer interface for the trunk recorder memory illustrated in FIG. 20.

With reference now to FIGS. 16, 17 and 25 the recorder buffer circuit 342 and the buffer control circuit 346 will now be more fully described.

Data from the toll buffer 104 is received at the buffer store input line 374 via gates 376, 378 and 380, and line OD. The data is input into a buffer store 382 on each pulse of the output synchronism or strobe (OS)

signal that is generated by the toll buffer 104.

The enable strobe flip-flop 384 allows each bit of the information to be clocked in with an 500KHZ input clock via a gate 386 while busy-free flip-flop 388 is reset. The strobe or synch signal is used to prevent noise from initiating the control sequence of the system. When all bits have been clocked in the buffer store 382, an end of message character or stop strobe (SS) signal, which is 16 microseconds in length and is generated by the toll buffer 104, is detected by flip-flops 384 and 390. In response to the end of message detection, the busy-free flip-flop 388 is set to busy out the toll buffer 104 until the message has been processed. The setting of the busy-free flip-flop 388 disables gate 386 and enables gate 390 to allow clock pulses from the 500 KHZ clock to recirculate the data in the register buffer store 382 via line 392 and gates 394 and 376. The buffer store 382 is stepped along in this manner until a start character (binary 13) is detected by an output character register which comprises J-K flip-flops 396, 398, 400 and 402. The start character is decoded by gates 404 and 406 whose output is used to set a stop clock flip-flop 408 and to disable the 500 kHz clock at gate 390 via line 391. At this point the recorder buffer 342 awaits a synchronizing clock start to provide a common point at which the recorder buffer 342 and trunk recorder memories 348 can transfer data. The common point is a system signal W6, BT3 which is the position in the memories 348 at which data will begin to be stored.

At system signal W6, BT3, stop clock flip-flop 408 is reset via lead 410 and start sending flip-flop 412 (FIG. 17) is set via gates 414–420 and a STCLR signal via lead 422. Gates 414–420 decode system timing signals from the recorder common 340 to produce system signal W6, BT3. The resetting of the stop clock flip-flop enables gate 390 and allows clock pulses to be transmitted therethrough. The data now circulates (as described before) under the influence of the 500 kHz clock and is also presented to the trunk recorder memories 348 via a line 423. The memories are alerted that information is being transferred by signal STSDR which is an output of the start sending flip-flop 412 transmitted via line 424. The information is continually presented to the trunk recorder memories 348 in this manner until there is an acknowledgment of the receipt of the data.

When the data is stored in the appropriate cell, a message received signal MR1, 2 from odd and even groups of memories sets a flip-flop 424 via gates 426, 428 and 430. This begins a resetting process for the recorder buffer circuitry via lead MRR and a gate 425. The start sending flip-flop 412, the idle latch 432, and the busy-free flip-flop 388 are all reset during this time.

If the call is not processed within two seconds, a holdover circuit including flip-flops 434, 436, 438, 440 and 442 (FIG. 15) times out the message by recognizing signal FRCLA (from the recorder 342 or 344) and transmits a signal AC to the fault accumulator including flip-flops 444 and 446 via gates and 448 and 450 and line 452. This causes a count of one to be stored in the fault accumulator and a resetting of the recording system via line 454 by signal RSTR from the recorder common trunk. The next call accepted from the toll buffer 104 is processed as described above and if completed correctly the fault accumulator will be reset by a memory receive signal transmitted thereto via line 456. If the system fails a second time, the fault accumulator will be advanced to two and alarm status flip-flop 458 will be set and provide an alarm status signal EWXLTR via a gate 460. This signal will allow the recorder common 340 to bring recorder buffer (B) 344 into operation.

The readout access (A) 354 and control 358 will now be more fully described with reference to FIGS. 18 and 19.

The purpose of the readout access circuit (A) 354 is to choose an idle readout circuit 360, 362 and provide for the transfer of data between the chosen readout circuit and a trunk recorder memory 348 with a completed call stored therein.

When a call has been completed and the trunk recorder memory 348 wishes to transfer data to a readout circuit 360, 362, the recorder memory 348 signals the readout access circuit 354 by initiating a service request (SR1-SR8). Each of the service request lines SR1-SR8 are checked sequentially by a trunk recorder memory request control circuit, including flip-flops 456, 458 and 460, which generates enabling signals (0–7) to selection gates 462. If the request control circuit enables one of the selection gates 462 while a service request (SR) signal is present, the associated control matrix latch 464 is set.

In operation, when both readout circuits 360, 362 are busy, signals ROBF1, ROBF2 from the readout circuits 360, 362 disable readout control gates 466, 468 and readout flip-flop 470 toggles at the clock rate. A signal on line ROBF1 enables the control gate 466 when readout 360 becomes free and, similarly, a signal on line ROBF2 enables control gate 468 when readout 362 becomes free. This enablement stops (via gates 472 and 474) the control flip-flop 470 from toggling by presenting a low signal to the J-K inputs. A readout available gate 476 is then used to signal the control matrix latches 464 of the available readout by presenting either the ROBF1 or ROBF2 signal via gates 466 or 468.

The matrix latches 464 are now enabled and provide an enabling signal EN1-EN8 to the trunk recorder memory 348 which the recorder request control 456, 458, 460 is selecting. The EN signals erase the SR requests and notify the memories 348 to start sending the data. At the same time the trunk recorder memory 348 is enabled by one of the enabling signals EN1-EN8, the available readout is signalled that data is being sent via line SRMDR and gates 478–484. The SRMDR signal further inhibits the clocking of the request control 456, 458, 460 via gates 486, 488.

The EN and SRMDR signals are maintained until the readout circuit 360 or 362 has received the complete record being sent by a trunk recorder memory 348 at which time it removes its free indication ROBF1 and ROBF2. The readout circuit 360 or 362 remains busy until it has transferred the record to the appropriate readout device. The two readout circuits 360 and 362 generally alternate in receiving new records.

Figure 19:
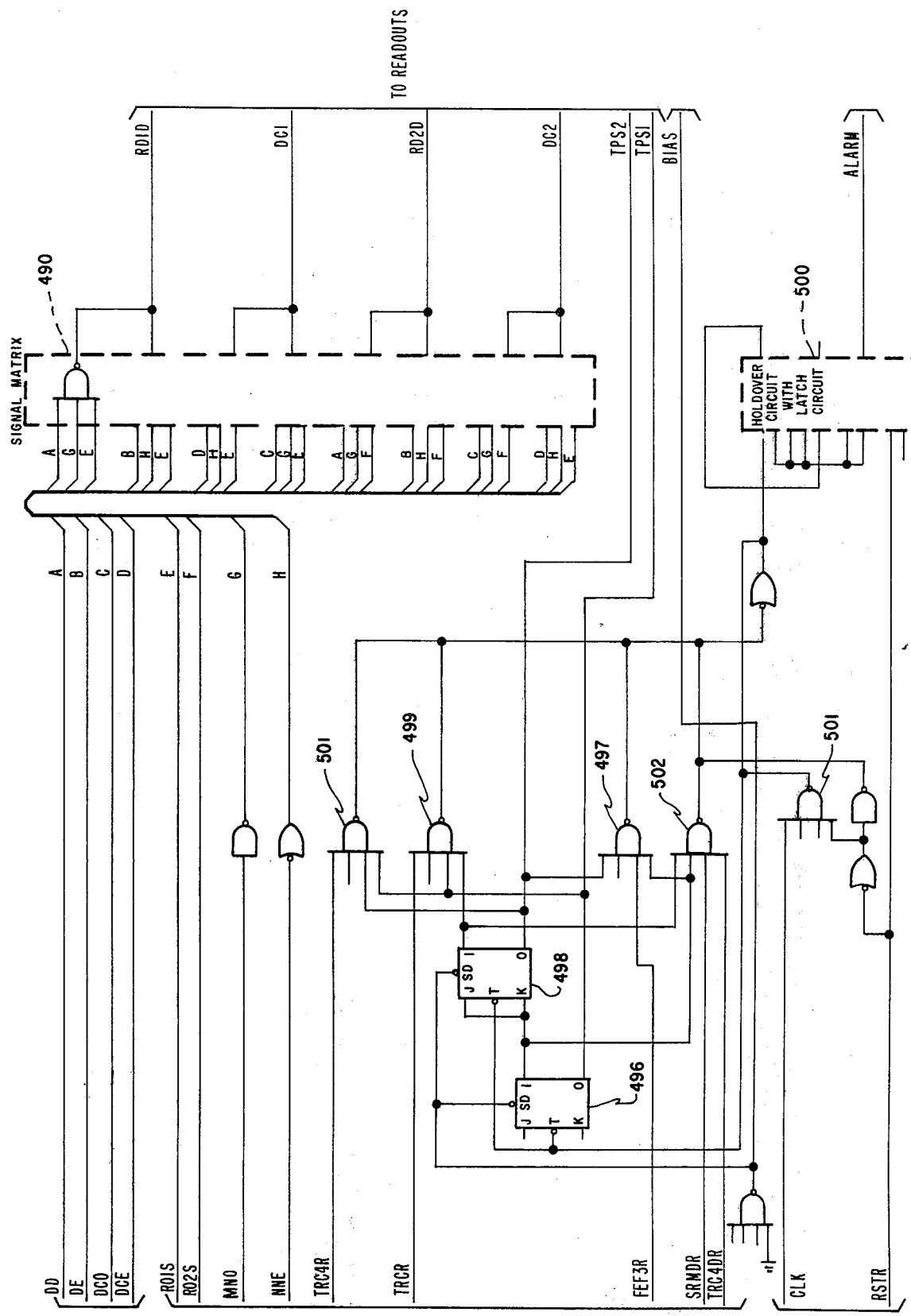

Data flow from the trunk recorder memories 348 to the readout circuits 360 and 362 is effected via a signal matrix 490 (FIG. 19). Each circuit is connected to a data (RO1D, RO2D) and a data check (DC1, DC2) line from the outputs of the matrix 490. Input data to the matrix 490 are transmitted from the recorder memories 348 on lines DE (data from even numbered recorders), DCE (data check from even numbered recorders), DO (data from odd numbered recorders), and DCO (data check from odd numbered recorders).

Figure 18:
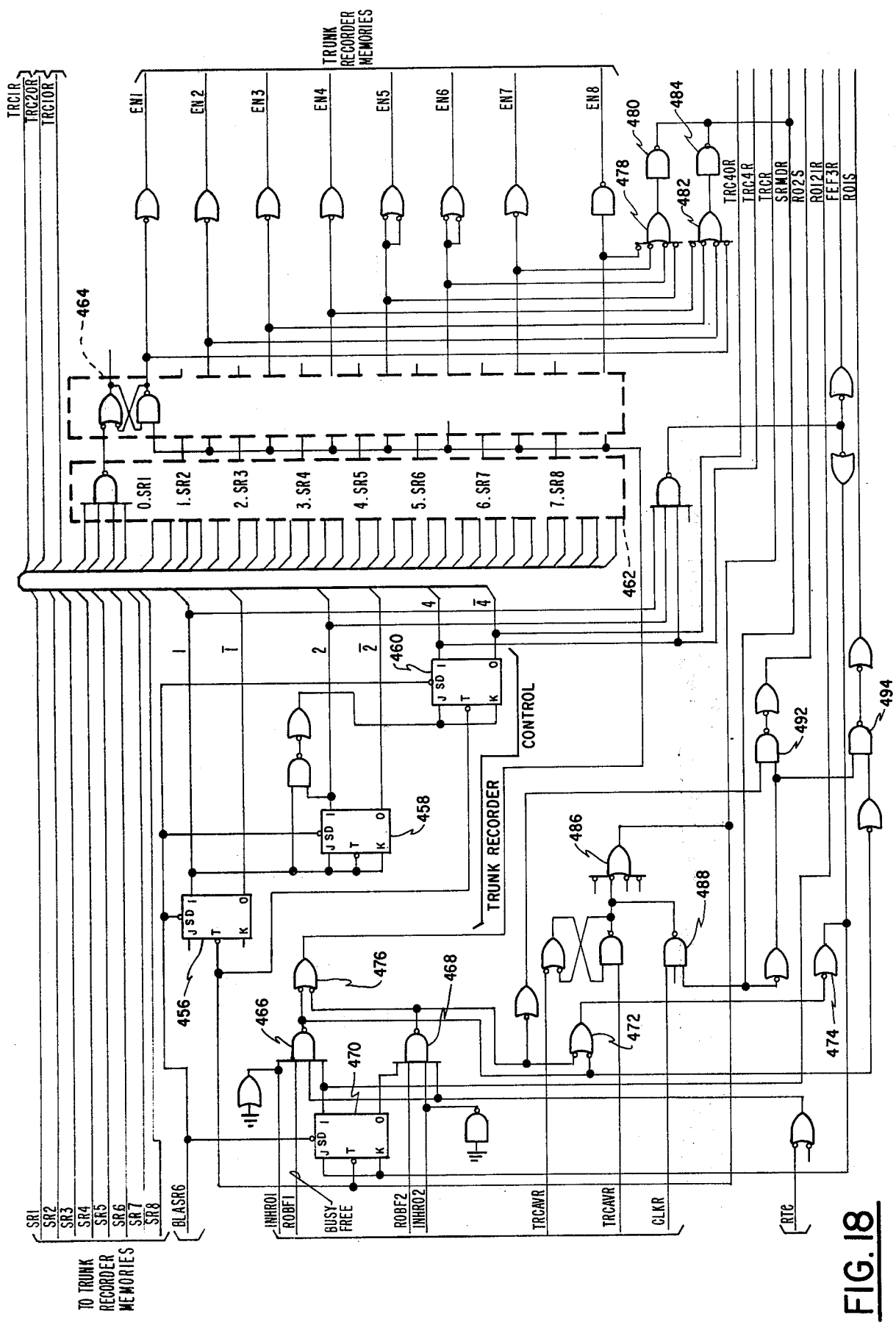
FIGS. 18 and 19 are detailed schematic diagrams of logic circuitry for the readout access circuit illustrated in FIG. 15.

Enabling lines for readout A and readout B (RO1S, RO2S) are from the enabling gates 466, 468 via gates 492, 494 (FIG. 18). Trunk memory number odd (MNO) and trunk memory number even (MNE) lines are further provided as inputs to the signal matrix 490 from the recorder common 340. The inputs to the signal matrix 490 are connected to assure that at least half of the trunk recorder memory units will continue to operate in the presence of a fault on one of the enabling leads. Check circuits for the readout access circuits 354, 356 are provided and include a test point scanner circuit, including flip-flops 496 and 498, and gates 497, 499, 501, 502 connected to a holdover circuit 500.

If a fault occurs, the holdover circuit 500 times out and the access circuit 354 is automatically reset via gate 502. If the fault immediately occurs again and the holdover circuit times out once more, the readout access circuit is alarmed via alarm lead and operations are transferred by the recorder common 342 to readout access (B).

The trunk recorder memories will now be more fully described with reference to FIGS. 20–27.

With reference to the block diagram in FIG. 20, there are shown component portions of one trunk recorder memory 340.

The trunk recorder memories 348 provide storage for toll information while a call is in progress and transfer the information to the readout circuits when the call is completed. Each memory 348 has a recirculating storage circuit 506 that may be written into or read from as needed by a memory control and timing circuit 510. The recorder memory 348 processes the call information received from a combination of three sources connected by interfaces. The recorder memory 348 is arranged to receive seizure and answer signals through a recording trunk interface circuit 512, call data from recorder buffer 342 through a recorder-operator buffer interface circuit 504, and when required, operator information from the operator access 350 through a recorder operator interface circuit 504. The recorder memory 348 transfers data to the readout access circuit 354 or 356 via an access interface 508.

In a preferred embodiment, there are eight trunk recorder memories 348 each having a capability of handling fifty calls simultaneously. The timing in recirculating storage circuit 506 is divided into 51 different cell addresses with cell "0" being used for testing purposes and with all other cells assigned to a specific recording trunk 100 of a group. Each cell address contains eighty, four bit, words for a total storage capacity of 16,320 bits. The storage circuit 506 is clocked at a 500 KHZ rate, providing each cell address with a 32.64 microsecond access time.

Each of the fifty recording cells in the storage circuit 506 has a loading program similar to that illustrated in FIG. 21. Part of the data stored in each cell is used only in the trunk recorder memory 348, a portion is received by the recorder buffer 342, a portion can be accessed and modified through the operator access circuit 350, and a portion is presented to the readout circuit 360, 362 at the completion of a call. Data presented by the recorder buffer 342 includes words 11 through 35. Data accessible to the operator access circuit 350 includes words 2, 3 and 8 through 63. Data sent to the readout circuits 360, 362 includes words 8 through 72. Words 1 and 4 through 7 are used for storage control functions. Words 0 and 72 through 79 are dedicated to be spare storage and are not presently utilized. The trunk recorder memories 348 provide the operator access portion so they may be used by other parts of the common control system, i.e., for 0+ ticketing.

Figure 22:
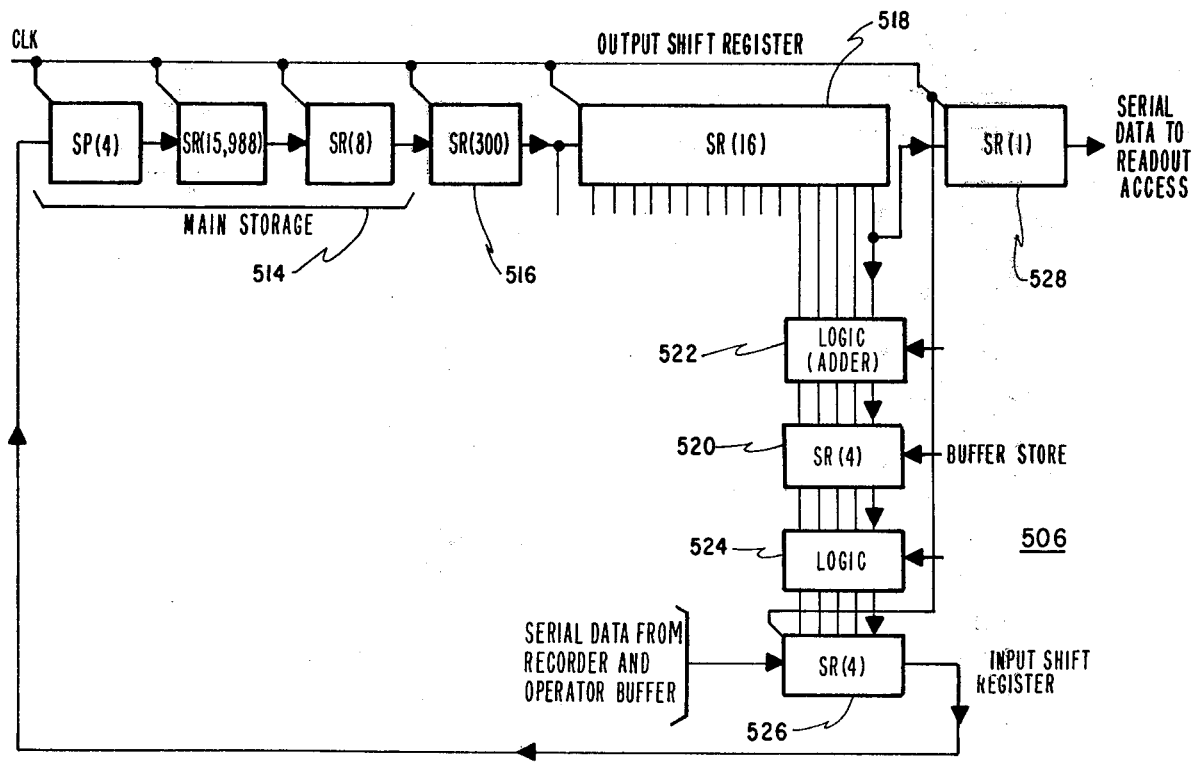
FIG. 22 is a detailed block diagram of the storage circuit for the trunk recorder memory illustrated in FIG. 20.

The storage circuit 506 and its operation will now be more fully discussed with reference to FIG. 22.

The storage circuit 506 comprises a serial main storage register 514 having 16,000 bits (50 words) of storage capacity and a serial auxiliary storage register 516 (320 bits) capacity, including a serial 300 bit register 516, connected to one end of the register 514, an output shift register 518 (16 bits) serially connected to the auxiliary register 516, a buffer register 520 (4 bits) connected in parallel with the final four bits of the output shift register 518 via logic circuitry 522, and an input register 526 (4 bits) connected in parallel with the buffer register 520 via logic circuitry 524 and serially connected to the other end of main storage register 514. Data may be recirculated through the main storage register 514, the auxiliary storage register 516, the output shift register 518, the buffer register 520, and the input register 526 to form a closed loop.

Input register 526 is arranged to receive the serial data input from the operator access circuit 350 and recorder buffer circuit 342, while the output register 518 provides serial data output to shift register 528 for transfer to the readout access circuit 354. The buffer register 520 and logic circuit 522, 524 are used to modify data in cells for supervision and call timing purposes. Since the call addresses are equivalent in length and storage capacity during recirculation, a plurality of similar timing signals are generated by the recorder common 340 to enable reading from and writing into the storage circuit 506 by the memory control and timing circuitry 510. Fifty-one cell addresses CA0-50 are generated to locate each storage space and eighty word addresses W0-79 are generated to locate data characters within each cell. Further, each bit of a character may be located by a bit time BT1-4.

For transfer through a register each word is shifted a bit at a time at the bit time signals BT1-4. For example, "word 0" appears at outputs 1–4 of output register 518 at W0, BT1. During W0, BT2; "word 0" is transferred to the buffer register 520 and the first bit of "word 1" is shifted to output 4. W0, BT3 shifts the second bit of "word 1" to the output 4 and the first bit to output 3. W0, BT4 provides another shift for "word 1" and transfers "word 0" to the input register 526. W1, BT1 shifts "word 1" completely into output 1–4 of register 518 and begins the shift out for "word 0" in register 526. This system then provides for constant recirculation and the modifying of the data in the buffer register 520 during BT3.

Figure 23:
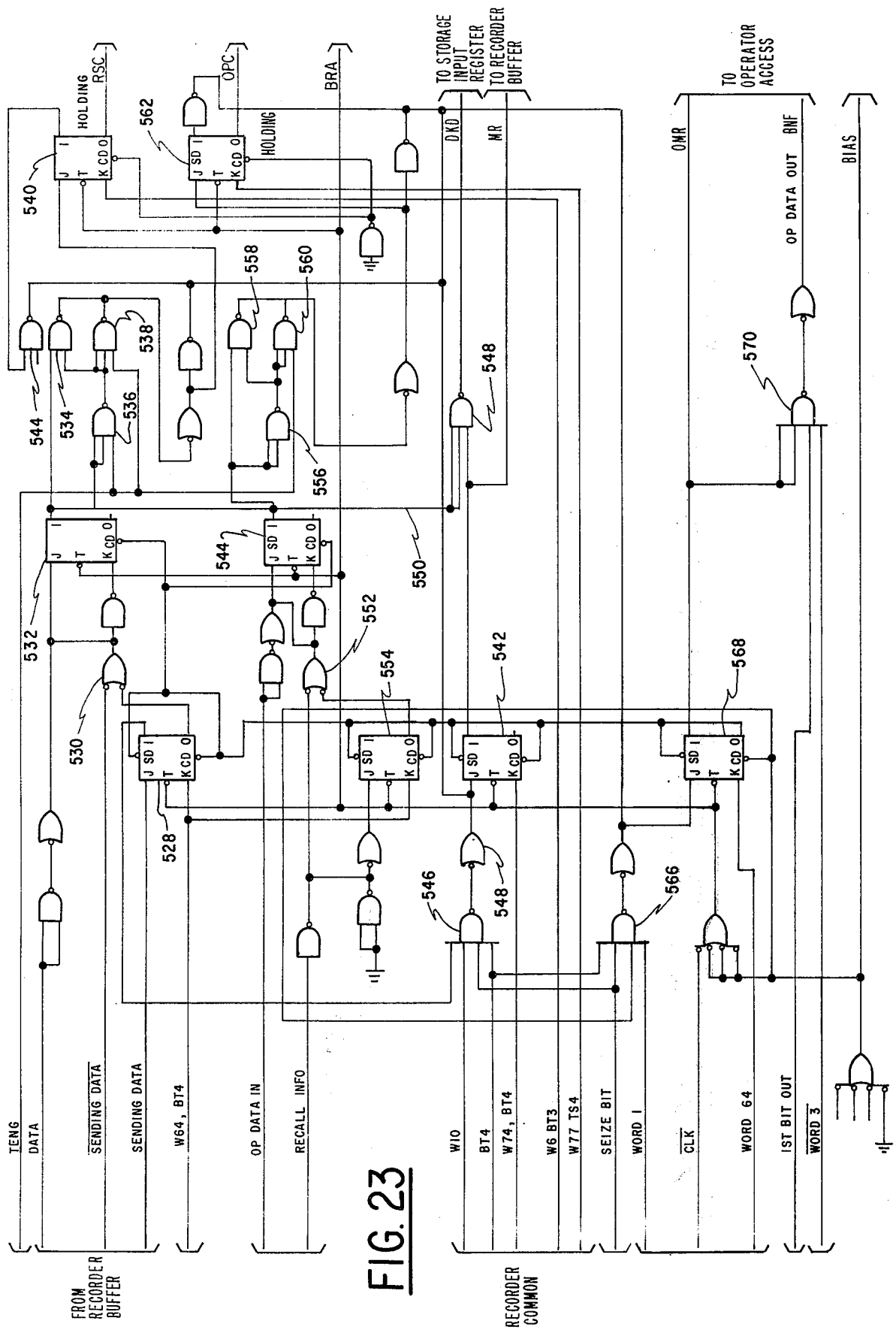
Figure 24:
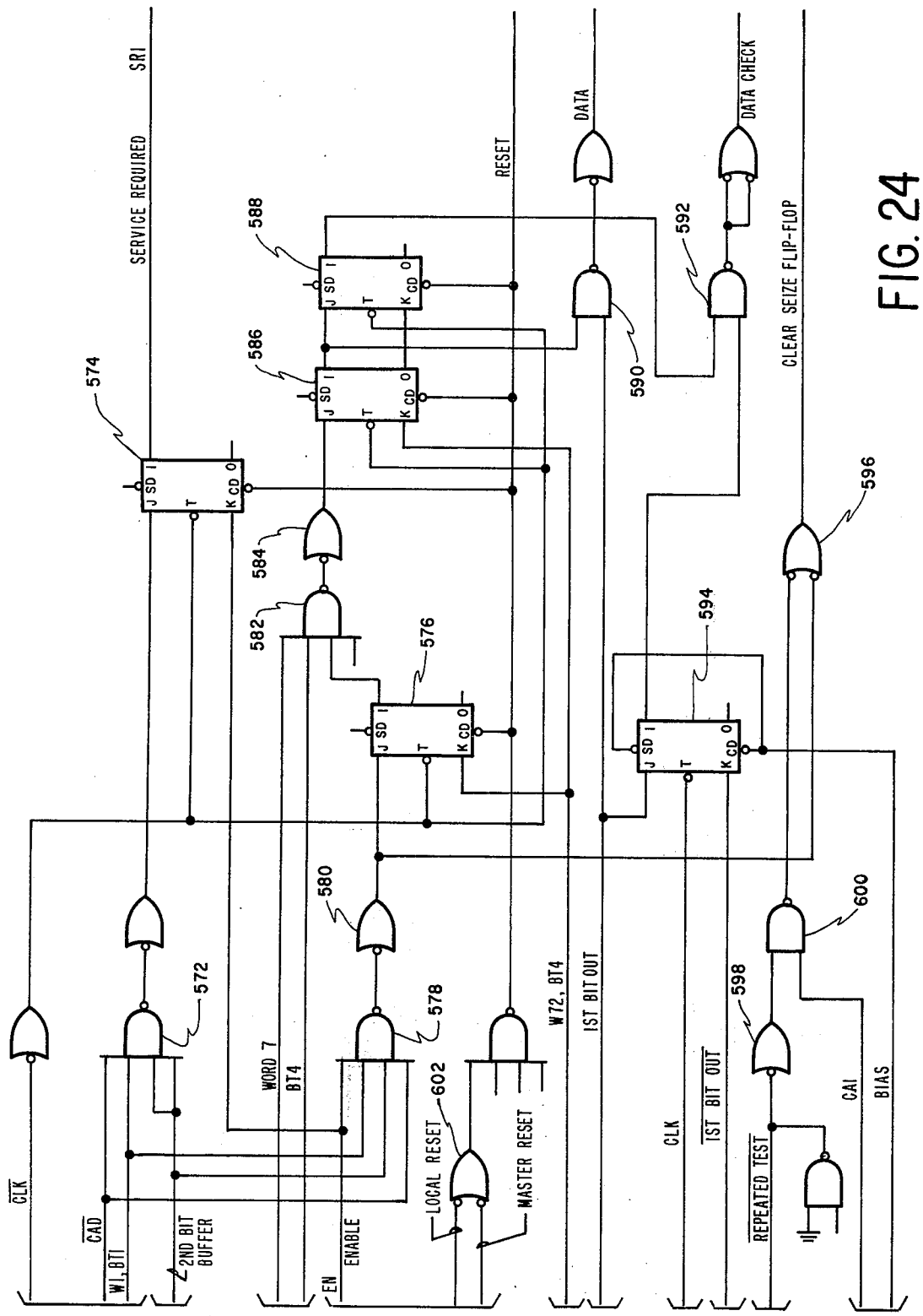
FIG. 24 is a detailed schematic diagram of logic circuitry in the readout access interface for the trunk recorder memory of FIG. 20, and FIGS. 26 and 27 are detailed schematic diagrams of logic circuitry of the output register, buffer register, and input register for the storage circuit illustrated in FIG. 22.
Figure 26:
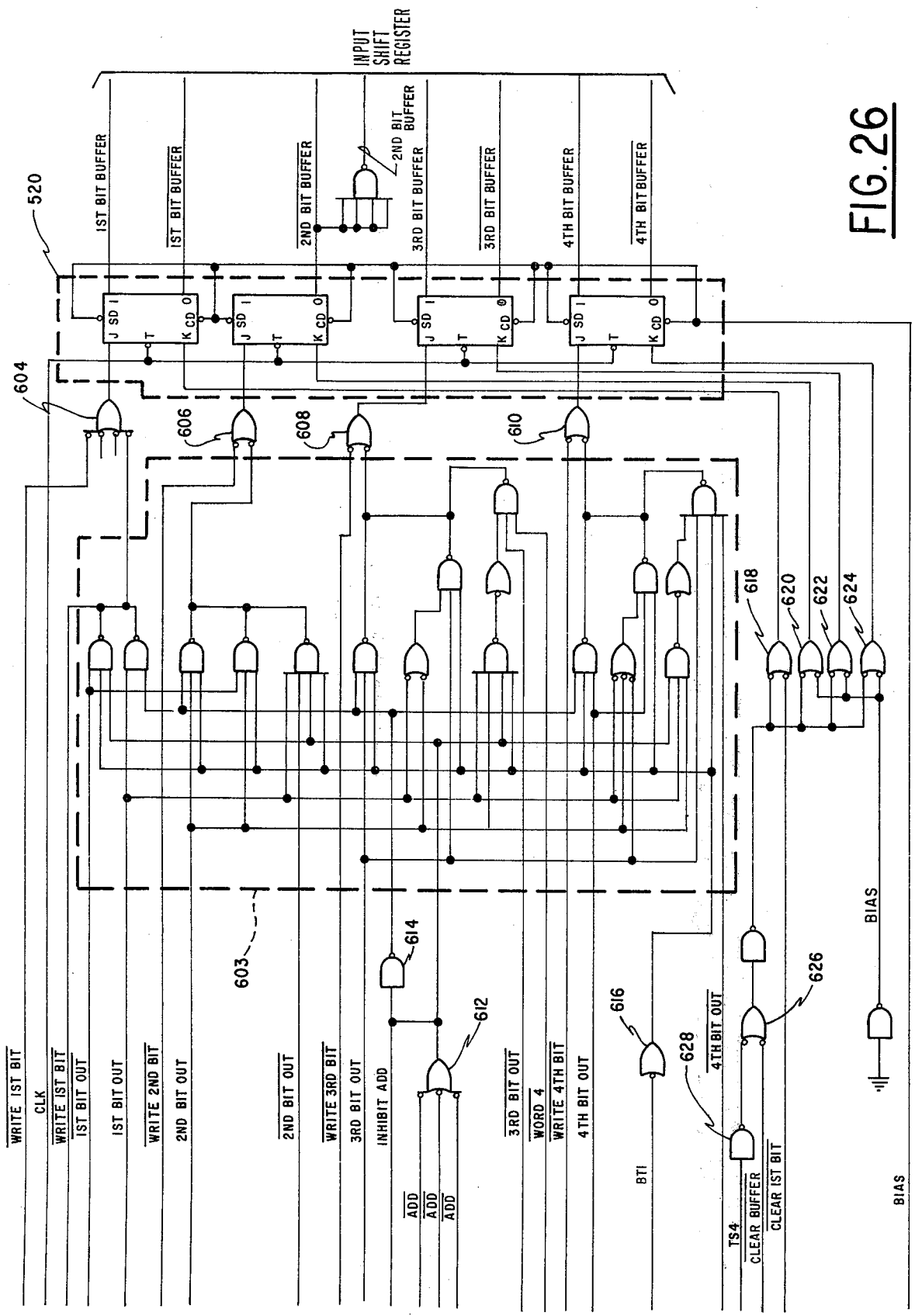

The interface circuits 504, 508, 510 of the recorder memories 348 will now be more fully explained by reference to FIGS. 23 and 24.

As was described before, the recorder buffer 342 outputs data and produces a sending data signal until answered with a message received signal. The sending data signal sets a check trunk number recorder buffer (CTNBR) flip-flops 528 (FIG. 23) the output of which, when "ORed" via a gate 530 with the inverted sending data signal, enables a reclocking flip-flop 532. FF532 reclocks the data from the recorder buffer 342 and presents it to comparator gates 534, 536 and 538, bit by bit, for comparison with the trunk number the memory 348 is presently servicing via signal TENG. Each trunk number is different in the system and therefore all memories simultaneously may look for a match. The trunk number is transmitted over line TENG and, it the numbers being compared match, a holding (H) flip-flop 540 is not set. If a match is not found, trunk detected (TD) flip-flop 542 is disabled via gate 544 by the setting of HFF 540.

Once a match is found, gate 546 sets the TDFF 542 via gate 548. The set signal from the gate 546 occurs at W10, BT4 (i.e., after the trunk number has been received) and the CTNBFF 528 has been set. Also required for enabling gate 546 is the presence of a seize bit signal which signifies that the recording trunk cell now being addressed has a bit written into bit 1, word one. This bit is written into the corresponding cell when a recording trunk 100 is seized by the trunk marker 70.

The trunk detected FF542, when it is set, enables a data gate 548. Data flows via the gate 548 from the RFF532 over line 550 to storage in the memory 348 at W11, BT1. The output of TDFF542 is further used to return the message received signal to the recorder buffer 342.

The operator access interface operates similarly to the recorder buffer interface in that data is presented to reclocking flip-flop 544 via line OP DATA. The RFF 544 is enabled by a check trunk number operator (CTNO) flip-flop 544 which is set by a RECALL INFO signal from the operator access circuit 350.

A comparison of the trunk numbers generated by the recorder memory 348 on line TENG and the trunk number present on line OP DATA, is effected by comparison gates 556, 558 and 560, and holding flip-flop 562. If a match is found, data is read into the storage upon the setting of the TDFF 542 through line 550 from the RFF 554. Also, upon the setting of send data flip-flop 568 via gate 556 the cell record is transferred from the output shift register 518 1st bit out line to the operator access circuit 350 via gate 570 over line OP DATA OUT. This feature allows the reading and modification of records by means of the operator access circuit 350. Setting the SDFF 564 also returns an operator message received (OMR) indication to the operator access circuit 350 and prepares the operator access circuit 350 to receive data from the trunk recorder memory 348.

The readout access interface circuit 508 will now be more fully explained by reference to FIG. 24.

The readout access interface circuit 508, as described before, provides a service request to the readout access circuit 354 when the interface circuit 508 has detected a completed call. The access circuit 354 answers with an enabling signal when it is ready to receive the data and data check information through the interface circuit 508 from the recorder memory 348. Each cell of a recorder memory 348 is sequentially interrogated for the presence of a disconnect entry set bit (final on hook, FOH) at W1, BT2 that will signify a completed call. When a FOH bit is set, a gate 572 is enabled and provides a setting pulse to the service required flip-flop 574. The service required FF 574 transmits a service request (SR) to the readout access circuit 354 to enter a request for a free readout circuit.

The readout access circuit 354, when ready to receive data transmits (via line EN) an enabling signal that clears the service required FF 574 and sets the call on hook FF 576 via gates 578 and 580.

The call on hook FF 576 enables a gate 582 and permits an information enable FF 586 to be set via gate 584 at W7, BT4. This enables a gate 590 to permit data to be transferred from the storage via 1st bit out line to the data line. "Word 8" to the end of the record, "word 72", is transferred in this manner. The same data is also sent as a data check signal via gate 592 a single clock count later. After being set by IEFF 586, the information check enable flip-flop 588 enables gate 592 and delayed data is supplied via an "INF +1" flip-flop 594.

The signal from gate 580 that begins the data transfer to the readout circuit when CAOH FF 576 is set also is used to initiate a clear seize flip-flop signal via gate 596. The clear seize flip-flop signal will free the recording trunk 100 associated with the cell address record being transferred.

The connection between the output, input, and buffer shift registers will now be more fully described with reference to FIGS. 27 and 27.

Output register 518 (FIG. 27) is a sixteen bit, serial register having outputs 1st–16th bit out, with outputs 1 to 4 connected to the buffer register 520 via a logic adder circuit 603 and one input of two input OR gates 604–610. The adder circuit 603 is arranged to increment certain words as they circulate through the storage by enabling the gates therein, via gates 614, 612 and the INHIBIT ADD line. The output from the adder circuit 603 is transferred to the buffer store via gates 604, 606, 608 and 610 by a BT1 signal applied to a gate 616. The adder circuit 603 is used principally for updating the elapsed time of a call as the stored record recirculates.

The second inputs to the OR gates 604, 606, 608 and 610 are the write lines (write 1st to 4th bits) from the timing and control circuit 510. These lines may be used to modify data in the buffer register during BT2, 3 and provide a new character for transfer into the input shift register 526 via lines 1st to 4th bit buffer. The calendar information and the control signals of the loading program are written into storage using the write lines (write 1st to 4bits).

The buffer register 520 is provided with reset gates 618–624 to clear the buffer register 520 of all four bits of information. The gates 618–624 may be used selectively to delete a word from a record or to erase the entire call via the clear buffer line and gate 626. The buffer register 520 is always cleared via gate 628 at BT4 after information has passed to the input shift register.

Figure 27:
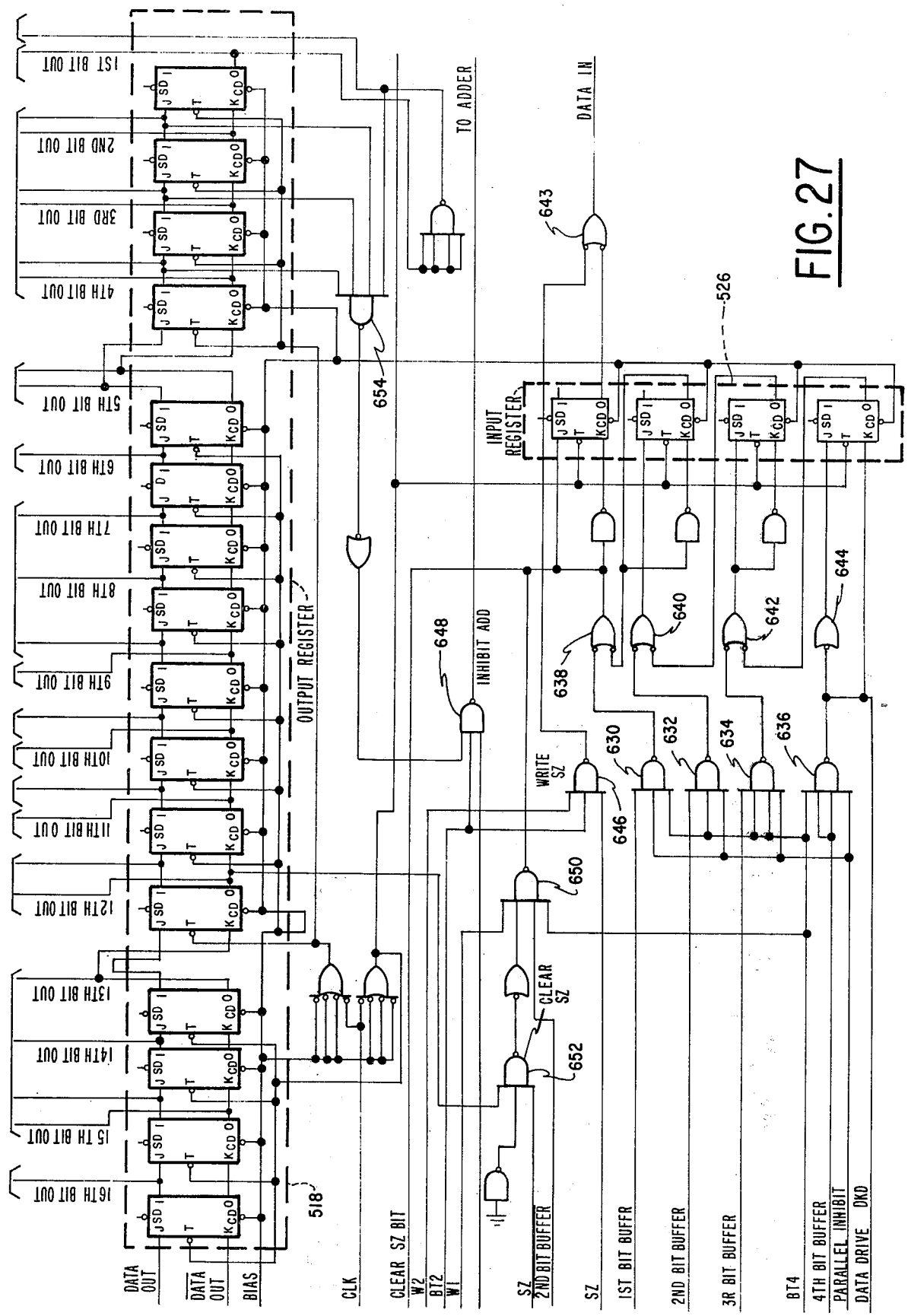

The input shift register 526 in FIG. 27 is loaded by the buffer bit lines 1st to 4th bit buffer via gates 638–644 when a BT4 signal gates 630–636. A parallel inhibit line is used to disable gates 630–636 when serial data is to be received from the recorder buffer 342 or operator access circuit 350 via the data drive line. The input shift register 526 is shifted out serially to the main store 541 through a gate 644 and the data in line.

An inhibit add gate 648 may be used to prevent the clearing of a word by overflow adding when a gate 654 detects all four bits of a word are "ones" via lines first-fourth bit out.

Gates 646 and 652 provide a means to write and clear, respectively, the seizure bit from the stage by decoding the conditions of the system. The seizure bit is written when the trunk marker 70 seizes a recording trunk 100 and is erased once the call is completed and recorded.

The specific embodiment disclosed herein is intended to be merely illustrative and not restrictive of the invention, since various modifications readily apparent to those familiar with the art to which the invention pertains can be made without departing from the scope and spirit of the invention as claimed herein.

What is claimed is:

1. A method for automatically toll ticketing sent paid station-to-station connections between a calling and called party in common control telephone systems having a plurality of time shared registers accessed by a common register control for the translation of information stored therein comprising the steps of:
 a. storing a calling number representation in a selected register;
 b. storing a called number representation in said selected register;
 c. storing a toll indicator in said selected register as a result of the translation of a dialed access code;
 d. scanning said common registers for a toll indicator during their respective common register control access times until a said indicator is found;
 e. transferring the stored representations and indicator from said register to a toll buffer circuit when said indicator is found in said register;
 f. seizing a recording trunk in response to the storage of a toll indicator in a register for connecting said calling and called parties;
 g. writing a seizure signal into a memory call upon seizure of said recording trunk;
 h. transferring the information stored in said toll buffer circuit into said memory cell after said seizure signal is written;
 i. writing an answer into said memory cell after the connection is completed through said recording trunk and said called party goes off hook;
 j. writing the elapsed time of the connection in said memory cell while the seizure and answer signal are stored in said memory cell;
 k. erasing the seizure signal from said memory cell when said calling party goes on hook;
 l. erasing the answer signal from said memory cell when said called party goes on hook;
 m. writing a disconnect signal into said memory cell when said seizure signal is erased and writing said disconnect signal into said memory cell when said answer signal is erased, and
 n. transferring the information stored in said memory cell onto an output medium after said disconnect signal is written.

2. An automatic message accounting system in a common control telephone exchange for toll charging a calling party connected to a called party, the common control exchange having a plurality of subscriber line circuits, a plurality of incoming and outgoing trunk circuits, a line link network, a trunk link network, a plurality of local registers responsive to dialed indications for effecting connections between said subscriber line circuits and said outgoing trunks through said line link network and trunk link network, a plurality of trunk registers responsive to dialed indications for effecting connections between said incoming trunks and said subscriber line circuits through said trunk link networks and line link network and for effecting connections between said incoming trunks and said outgoing trunks through said trunk link networks, a common control accessing said local and trunk registers on a time shared basis including translation circuits for path finding in accordance with said dialed indications stored in said local and trunk registers and a common register control for transferring the dialed indications stored in said logic and trunk registers to said translation circuits during the access time of said local and trunk registers, said automatic message accounting system comprising:
 a first plurality of recording trunks included in said plurality of outgoing trunks, each of said recording trunks being arranged to a generate seizure signal when selected for connection and to a generate answer signal when the connection is completed to a called party and said called party goes off-hook;
 a toll buffing circuit arrangement to store said dialed indications from one of said local and trunk registers and to store the identity of one of said recording trunks when selected for connection;
 scanning means for scanning said stored indications transferred by said common register control from said local and trunk registers to said translation circuits during said path finding access time;
 detection means for detecting the presence of a toll indicator in said dialed indications during said scan;
 storage means responsive to the detection of the toll indicator for storing the dialed indications present in said local and trunk registers into said toll buffer, and
 a recorder connected between said toll buffer and a selected recording trunk, said recorder including a memory sectioned into a plurality of recording cells, each of said recording cells being dedicated to a particular one of said plurality of recording trunks, means responsive to the generation of said seizure and answer signal for writing said seizure and answer signals into the dedicated cell corresponding to said selected recording trunk, means responive to the writing of said seizure signal in said cell, for transferring the dialed indications stored in said toll buffer into said cell, said means responsive to the writing of said answer signal in said cell, for storing calendar and elapsed time information into said corresponding cell and means, responsive to the return of one of said calling party and said called party on hook, for writing the stored information onto a recording medium.

3. A toll buffer circuit for a common control telephone exchange having a plurality of time shared registers each having an access time for communicating data over a plurality of bus lines to translation circuits under the direction of a common register control, said buffer circuit comprising:
 a plurality of data lines connected on a one-to-one basis with said bus lines;
 a plurality of serial shift registers, wherein each register includes a plurality of sections that may be selectively loaded from one of said plurality of data lines, detection means arranged to detect the presence of a toll indicator on said data lines during said shared access time, input shifting means responsive to the detection of a toll indicator for shifting said data appearing on the data lines into selected sections of each shift register, control means for selecting said particular sections said data will be stored into and for enabling said input shifting means to load said data into a particular section during the selection thereof;

output shifting means for concatenated unloading of the loaded data synchronously in parallel words from said plurality of shift registers, and multiplexer means arranged to receive said parallel concatenations and to multiplex said parallel words into a serial bit stream.

4. An automatic message accounting recorder for a common control telephone system having toll information stored in time shared registers accessed by a common register control and having a plurality of recording trunks producing a seizure signal and a trunk number identity upon being selected for connection and producing an answer signal when a called party goes off hook, the recorder comprising:

a plurality of trunk recorder memories, each of which is dedicated to a particular group of said plurality of recording trunks, including a recirculating memory sectioned into a plurality of recording cells, each of said recording cells being dedicated to a particular one of said recording trunks in said dedicated group;

a recorder buffer circuit for receiving and storing said toll information and trunk identity from the common register control during the access time of a said register when said recording trunk has been selected;

means for recirculating the toll information stored in said recorder buffer circuit into synchronism with said recirculating recording cells;

means responsive to the generation of said seizure and answer signals for writing said seizure and answer signals into the dedicated cell corresponding to said selected recording trunk;

comparison means for comparing said trunk identity stored in said recorder buffer circuit with the identities of trunks dedicated to said recording cells during the recirculation time of said cells and detecting a match therebetween;

means responsive to the writing of said seizure signal for transferring said toll information from the recorder buffer to said corresponding cell upon detection of a match by said comparison means;

means responsive to the writing of said answer signal in said corresponding cell for storing calendar and elapsed time information into said corresponding cell, and means responsive to the return of one of said calling party and said called party on hook for writing the information stored in said corresponding cell onto a recording medium.

5. A method for automatically toll ticketing sent paid station-to-station connections as defined in claim 1 wherein:

the step of storing a called number representation in said selected register includes the substeps of selecting said selected register to be a local register; connecting a line circuit; connectable to any of a plurality of local junctors through a line switching network, to said local register via one of said local junctors and a service line switching network; and storing said called number representation from the dialed indications of said connection line circuit, the step of storing a calling number representation in a selected register includes the substeps of translating the equipment number of said line circuit into a directory number and storing said directory number with an office code as said representation of said calling number, and the step of seizing a recording trunk in response to the storage of a toll indicator in a register for connecting said calling and called parties includes the substeps of translating said called number into an indication for an outgoing tributary connection; seizing said recording trunk connected to said outgoing tributary connection; and connecting said line circuit to said recording trunk via said local junctor and a trunk switching network.

6. A method for automatically toll ticketing sent paid station-to-station connections as defined in claim 1 wherein:

the step of storing a called number representation in said selected register includes the substeps of selecting said selected register to be a trunk register; connecting an incoming trunk, connected to a trunk junctor, to said trunk register via said trunk junctor and a trunk service switching network; and receiving the called number from an originating office over said trunk to register connection, the step of storing a calling number representation in a selected register includes the substeps of signalling said originating office to send said calling number when said called number is stored, and the step of seizing a recording trunk in response to the storage of a toll indicator in said register for connecting said calling and called parties includes the substeps of translating said called number into an indication for an outgoing tributary connection, seizing said recording trunk connected to said outgoing tributary connection, and connecting said incoming trunk to said recording trunk via said trunk junctor and a trunk switching network.

7. A method for automatically toll ticketing sent paid station-to-station connections as defined in claim 6 wherein:

the step of storing a calling number representation in a selected register includes the substeps of connecting said trunk register to an operator via an operator number identification link in response to a failure of the originating office to store said calling number, and storing operator dialed indications as the representation of the calling number in response to the identification of the calling party.

8. A method for automatically toll ticketing sent paid station-to-station connections as defined in claim 1 wherein:

the step of storing a called number representation in said selected register includes the substeps of selecting said selected register to be a trunk register, connecting an incoming trunk, connected to a trunk junctor, to said trunk register via said trunk junctor and a trunk service switching network, receiving the called number from an originating office over said trunk to register connection, the step of storing a calling number representation in a selected register includes the substeps of signalling said originating office to send said calling number when said called number is stored, and the step of seizing a recording trunk in response to the storage of a toll indicator in said register for connecting said calling and called parties includes the substeps of seizing a recording trunk, connected to said trunk junctor through a trunk switching network and connected to a second trunk junctor, and connecting said line circuit to said incoming trunk via a ringing control through a line switching network and said second trunk junctor, said recording trunk, and said trunk junctor through said trunk switching network.

9. A method for automatically toll ticketing sent paid station-to-station connections as defined in claim 8 wherein:

the step of storing a calling number representation in a selected register includes the substeps of connecting said trunk register to an operator via an operator number identification link in response to a failure of the originating office to store said calling number, storing operator dialed indications as the representation of the calling number in response to the identification of the calling party.

10. A method for automatically toll ticketing sent paid station-to-station connections as defined in claim 1 wherein:

the step of storing a called number representation in said selector register includes the substeps of selecting said selected register to be a trunk register; connecting an operator number identification trunk, connected to a trunk junctor, to said register via said trunk junctor and a trunk service switching network; connecting a line circuit, connectable to any of a plurality of local junctors through a line switching network, to a local register via one of said local junctors and a service line switching network, storing said called number representation from the dialed indications of said connected line circuit into said local register, connecting said operator number identification trunk to said local junctor via a trunk switching network thereby connecting said local register to said trunk register; transferring said called number representation to said trunk register from said local register, the step of storing a calling number representation in a selected register includes the substeps of connecting said trunk register to an operator via an operator number identification link in response to an indication that said line circuit is a multi-party line, and storing operator dialed indications as the representations of the calling number in response to the calling party identification, and the step of seizing a recording trunk in response to the storage of a toll indicator in a register for connecting said calling and called parties includes the substeps of translating said called number into an indication for an outgoing tributary connection, seizing said recording trunk connected to said outgoing tributary connection, connecting said line circuit to said recording trunk via said local junctor, said operator number identification trunk junctor and through said trunk switching network.

11. An automatic message accounting system as defined in claim 2 wherein said automatic message accounting system includes:

a plurality of operator number identification link circuits, each connected between one of said trunk registers and an operator position means, said operator position means for dialing at least part of said dialed indications stored in said trunk registers.

12. An automatic message accounting system as defined in claim 11 wherein said automatic message accounting system includes:

a second plurality of recording trunks each being connected to one of said trunk junctors and to an output port of said trunk link network thereby providing a toll recording path for tributary-to-local connections.

13. An automatic message accounting system as defined in claim 11 wherein said automatic message accounting system includes:

a plurality of operator number identification trunks, each being connected to one of said trunk junctors and to an output port of said trunk link network thereby providing access for said line circuits to said operator number identification link circuits.

14. An automatic message accounting recorder as defined in claim 4 which additionally includes:

a toll buffer circuit connected between said registers and said recorder buffer comprising;

a plurality of data lines connected to a one-to-one basis with a plurality of bus lines of said common register control;

a plurality of serial shift registers, wherein each register includes a plurality of sections that may be selectively loaded from one of said plurality of data lines, detection means arranged to detect the presence of a toll indicator on said data lines during said shared access time, input shifting means responsive to the detection of a toll indicator for shifting said data appearing on the data lines into selected sections of each shift register, control means for selecting the particular sections said data will be stored into and for enabling said input shifting means to load said data into a said particular section during the selection thereof;

output shifting means for concatenated unloading of the loaded data synchronously in parellel words from said plurality of shift registers;

multiplexer means arranged to receive said parallel words and to multiplex said parallel words into a serial bit stream to said recorder buffer, means for generating a start character at the beginning of said serial bit stream, means for generating an end of message character at the end of said serial bit stream, and means for generating an output strobe signal for every bit of said serial bit stream.

15. An automatic message accounting recorder as defined in claim 14 wherein said recirculating means include:

clocking means for recirculating said recorder buffer circuit at the same frequency as said recording cells;

input means connected to said toll buffer for loading said serial bit stream into said recorder buffer from said toll buffer, and output means for transmitting said serial bit stream to said recording cells in synchronism with said recording cells, said recorder buffer circuit being connected between said input means and said output means and recirculating data in response to said clocking means.

16. An automatic meassage accounting recorder as defined in claim 15 wherein:

said input means includes means for loading said serial bit stream into said recorder buffer in synchronism with said stroke signal, and means for terminating said loading in response to the end of message character.

17. An automatic message accounting recorder as defined in claim 16 wherein:

said output means includes start character detection means for detecting the presence of said start character at the output means;

disabling means for stopping said clocking means in response to said start character detection, thereby stopping said recorder buffer from recirculating;

enabling means for starting said stopped clocking means in response to a sync signal from said trunk recorder memories indicating the beginning of a recording cell time, thereby placing said data in synchronism with said recording cells, and transmission means for transmitting said data to the trunk recorder memories.

18. An automatic message accounting recorder as defined in claim 4 wherein the recirculating memory of said trunk recorder memories includes:

a serial input shift register for receiving said serial data stream from said recorder buffer;

a serial main storage register means, connected serially to said output of said input register, for serially shifting said data therethrough;

a serial output shift register, connected serially to the output of said main storage register means, for shifting said serial data therethrough to said recording medium, said input register and said output register being tied in parallel for recirculating said data.

19. An automatic message accounting recorder as defined in claim 18 wherein said recirculating memories include modifying means connected between said input register and said output register for changing data flowing therethrough during recirculation.

20. An automatic message accounting recorder as defined in claim 4 wherein said recorder further includes:

operator access means connected to said trunk recorder memories and to an operator position for modifying data stored in individual recording cells under the supervision of an operator.

* * * * *